US011868686B2

(12) United States Patent
Kumar et al.

(10) Patent No.: US 11,868,686 B2
(45) Date of Patent: Jan. 9, 2024

(54) SYSTEM AND METHOD FOR MANUFACTURE AND CUSTOMIZATION OF CONSTRUCTION ASSEMBLIES IN A COMPUTING ENVIRONMENT

(71) Applicant: Slate Technologies Inc., Pleasanton, CA (US)

(72) Inventors: Senthil Manickavasagam Kumar, Dublin, CA (US); Daniel Sullivan, San Francisco, CA (US); Joel Hutchines, Fort Lauderdale, FL (US)

(73) Assignee: Slate Technologies Inc., Pleasanton, CA (US)

( * ) Notice: Subject to any disclaimer, the term of this patent is extended or adjusted under 35 U.S.C. 154(b) by 0 days.

(21) Appl. No.: 18/107,653

(22) Filed: Feb. 9, 2023

(65) Prior Publication Data

US 2023/0281358 A1 Sep. 7, 2023

Related U.S. Application Data

(60) Provisional application No. 63/316,609, filed on Mar. 4, 2022.

(51) Int. Cl.
*G06F 30/20* (2020.01)
*G06F 30/12* (2020.01)
(Continued)

(52) U.S. Cl.
CPC .............. *G06F 30/20* (2020.01); *G06F 30/12* (2020.01); *G06F 30/13* (2020.01); *G06F 30/18* (2020.01)

(58) Field of Classification Search
CPC .......... G06F 30/20; G06F 30/18; G06F 30/13; G06F 30/12
(Continued)

(56) References Cited

U.S. PATENT DOCUMENTS 2,052,346 A * 8/1936 Garrett ...................... E04B 2/72
52/274
7,113,915 B1 9/2006 Montemayor
(Continued)

FOREIGN PATENT DOCUMENTS

WO 2022026520 A1 2/2022

OTHER PUBLICATIONS

Yang et al. ("Adopting Building Information Modeling (BIM) for the Development of Smart Buildings: A Review of Enabling Applications and Challenges", Hindawi Advances in Civil Engineering, 2010, pp. 1-26) (Year: 2010).*
(Continued)

*Primary Examiner* — Iftekhar A Khan
(74) *Attorney, Agent, or Firm* — Haverstock & Owens, A Law Corporation

(57) ABSTRACT

A method for simulating a product in a computing environment includes analyzing data related to at least constructional representation, determining a requirement of prefabricating at least one custom construction artefact for a construction project based on the analysis of the data, determining at least one of: an intent or at least one objective associated with the at least one custom construction artefact, and enabling simulation of the at least custom construction artefact based on the determination of the intent or the at least one objective to render a digital representation of the product in a graphical user interface.

17 Claims, 9 Drawing Sheets

(51) Int. Cl.
*G06F 30/13* (2020.01)
*G06F 30/18* (2020.01)

(58) Field of Classification Search
USPC .......................................................... 703/1
See application file for complete search history.

(56) References Cited

U.S. PATENT DOCUMENTS

| | | | | |
|---|---|---|---|---|
| 7,283,975 | B2* | 10/2007 | Broughton | G06Q 10/087 705/28 |
| 8,204,619 | B2* | 6/2012 | Heil | G06F 30/13 700/98 |
| 8,260,648 | B2 | 9/2012 | Elazouni et al. | |
| 8,775,229 | B1 | 7/2014 | Danskin | |
| 9,189,571 | B2* | 11/2015 | Loberg | G06Q 10/087 |
| 9,507,885 | B2* | 11/2016 | Yu | G06F 30/13 |
| 9,996,810 | B2 | 6/2018 | Augenstein et al. | |
| 10,311,529 | B1 | 6/2019 | Noel et al. | |
| 10,452,790 | B2* | 10/2019 | Kim | G06F 30/13 |
| 10,460,173 | B2* | 10/2019 | Sasson | G06F 18/2113 |
| 10,572,848 | B2 | 2/2020 | Sen | |
| 10,713,607 | B2* | 7/2020 | Pettersson | G06K 19/0723 |
| 10,846,640 | B2 | 11/2020 | Goel et al. | |
| 10,970,796 | B2 | 4/2021 | Sasson et al. | |
| 11,017,335 | B1* | 5/2021 | Ponce de Leon | G06Q 10/063116 |
| 11,176,495 | B1* | 11/2021 | Ron | G06Q 30/0201 |
| 11,208,807 | B1* | 12/2021 | Lopes | E04C 2/384 |
| 11,263,371 | B2* | 3/2022 | Bowen | G06F 30/20 |
| 11,263,557 | B2 | 3/2022 | Yellin | |
| 11,381,726 | B2 | 7/2022 | Zass | |
| 11,481,853 | B2 | 10/2022 | Bellaish et al. | |
| 11,531,943 | B1* | 12/2022 | Kumar | G06F 18/217 |
| 2002/0156668 | A1 | 10/2002 | Morrow et al. | |
| 2003/0018507 | A1* | 1/2003 | Flanagan | G06Q 10/06 705/7.23 |
| 2003/0200062 | A1* | 10/2003 | Dessureault | G06F 30/13 703/1 |
| 2004/0236547 | A1* | 11/2004 | Rappaport | G06F 30/13 703/2 |
| 2006/0059838 | A1* | 3/2006 | Pimental | E04C 1/395 52/596 |
| 2006/0075718 | A1* | 4/2006 | Borne | G06F 30/13 52/745.02 |
| 2006/0190391 | A1 | 8/2006 | Cullen, III et al. | |
| 2006/0228962 | A1* | 10/2006 | Souther | D04H 3/16 442/364 |
| 2007/0245300 | A1 | 10/2007 | Chan et al. | |
| 2007/0265724 | A1* | 11/2007 | Mifsud | B21F 27/128 700/95 |
| 2007/0271073 | A1* | 11/2007 | Mifsud | B21F 27/128 703/1 |
| 2008/0005079 | A1* | 1/2008 | Flake | G06F 16/9535 |
| 2008/0015823 | A1* | 1/2008 | Arnold | G06F 8/20 703/1 |
| 2008/0040264 | A1 | 2/2008 | Allin et al. | |
| 2008/0077364 | A1* | 3/2008 | Wakelam | G06F 30/17 703/1 |
| 2008/0109330 | A1* | 5/2008 | Torres | G06Q 10/06 705/29 |
| 2008/0313110 | A1 | 12/2008 | Kreamer | |
| 2010/0010883 | A1 | 1/2010 | Neilsen et al. | |
| 2010/0153280 | A1* | 6/2010 | Fox | G06Q 50/188 709/227 |
| 2010/0235206 | A1* | 9/2010 | Miller | E04D 3/352 703/1 |
| 2011/0181589 | A1 | 7/2011 | Long et al. | |
| 2012/0066019 | A1* | 3/2012 | Hinshaw | G06Q 10/06 705/7.23 |
| 2012/0131878 | A1* | 5/2012 | Ivanov | A63H 33/084 52/655.1 |
| 2012/0166177 | A1* | 6/2012 | Beld | G06F 40/20 704/9 |
| 2013/0155058 | A1* | 6/2013 | Golparvar-Fard | G06Q 10/06311 345/419 |
| 2014/0122143 | A1 | 5/2014 | Fletcher | |
| 2015/0193561 | A1* | 7/2015 | Lindberg | G06F 30/13 703/1 |
| 2016/0292306 | A1* | 10/2016 | Migneault | G06F 30/00 |
| 2016/0378861 | A1 | 12/2016 | Eledath et al. | |
| 2017/0337261 | A1 | 11/2017 | Wang | |
| 2018/0276319 | A1* | 9/2018 | Tierney | G06F 30/13 |
| 2019/0138667 | A1* | 5/2019 | Benesh | G06Q 50/08 |
| 2019/0200169 | A1 | 6/2019 | Bapna et al. | |
| 2019/0286985 | A1 | 9/2019 | Hirvijarri | |
| 2019/0303512 | A1 | 10/2019 | Davies et al. | |
| 2019/0317805 | A1 | 10/2019 | Metsch et al. | |
| 2020/0042915 | A1* | 2/2020 | Samson | G06Q 50/08 |
| 2020/0057811 | A1 | 2/2020 | Seegan et al. | |
| 2020/0412926 | A1 | 12/2020 | Zass et al. | |
| 2020/0413011 | A1 | 12/2020 | Zass et al. | |
| 2021/0073694 | A1* | 3/2021 | Yellin | G06Q 30/0635 |
| 2021/0081819 | A1 | 3/2021 | Polleri et al. | |
| 2021/0081859 | A1 | 3/2021 | Goel | |
| 2021/0120206 | A1 | 4/2021 | Liu et al. | |
| 2021/0125124 | A1 | 4/2021 | Meharwade et al. | |
| 2021/0192099 | A1* | 6/2021 | Benromano | G06Q 10/06 |
| 2021/0287177 | A1 | 9/2021 | Musialek et al. | |
| 2021/0316457 | A1* | 10/2021 | Kang | G06F 30/12 |
| 2021/0316459 | A1* | 10/2021 | Kang | G06F 16/9577 |
| 2021/0350310 | A1 | 11/2021 | Tashkin | |
| 2021/0383033 | A1* | 12/2021 | Glenn | G06Q 50/165 |
| 2022/0066456 | A1 | 3/2022 | Ebrahimi Afrouzi et al. | |
| 2022/0084140 | A1* | 3/2022 | Daczko | G06Q 50/08 |
| 2022/0130145 | A1 | 4/2022 | Connary et al. | |
| 2022/0215135 | A1* | 7/2022 | Shortridge | G06F 30/13 |
| 2022/0245353 | A1 | 8/2022 | Turkkan et al. | |
| 2022/0318936 | A1 | 10/2022 | Copley et al. | |
| 2022/0358259 | A1* | 11/2022 | Jain | G06N 20/20 |
| 2022/0405436 | A1* | 12/2022 | Jung | G06F 30/12 |
| 2023/0185978 | A1* | 6/2023 | Danon | G06F 30/12 703/1 |
| 2023/0251631 | A1* | 8/2023 | Pedersen | G05B 19/4155 700/159 |

OTHER PUBLICATIONS

Valdes et al. ("Applying Systems Modeling Approaches to Building Construction", ISARC 2016, pp. 1-9) (Year: 2016).*
Bortolini et al. ("Site logistics planning and control for engineer-to-order prefabricated building systems using BIM 4D modeling", Automation in Construction 98 (2019) 248-264) (Year: 2019).*
Jun Yang et al., Construction Performance Monitoring Via Still Images, Time-Lapse Photos and Video Streams; Now, Tomorrow, and The Future , Advance Engineering Informatics, vol. 29, Issue 2, 2015, pp. 211-224, ISSN 1474-0346. (Year 2015).
Venkatasubramanian, Karthik, "Using AL and Machine Learning to Predict Construction Schedule Delays", Oracle Construction and Engineering Blog, Jul. 1, 2021, pp. 1-5.
Fitzsimmons, John et al., " Improving Construction Project Schedules Before Execution", 37th International Symposium on Automation and Robotics in Construction (ISARC 2020), pp. 1-8.
International Searching Authority, "International Search Report and Written Opinion" in application No. PCT/US2023/012778, dated May 16, 2023, 18 pages.
International Searching Authority, "International Search Report" and "Written Opinion" in application No. PCT/US2023/014257, dated Jun. 2, 2023, 14 pages.

* cited by examiner

SYSTEM AND METHOD FOR MANUFACTURE AND CUSTOMIZATION OF CONSTRUCTION ASSEMBLIES IN A COMPUTING ENVIRONMENT

RELATED APPLICATION(S)

This application claims priority under 35 U.S.C. § 119(e) of the co-pending U.S. Provisional Patent Application Ser. No. 63/316,609, filed Mar. 4, 2022, and titled "System and Method for Design, Manufacture, and Customization of Construction Assemblies" which is hereby incorporated by reference in its entirety.

This application is related to U.S. Provisional Application No. 63/280,881, filed Nov. 18, 2021, and titled "Method and System for Multi-Factor Optimization of Schedules and Resource Recommendations for Smart Construction Utilizing Human and Machine Cognition," U.S. patent application Ser. No. 17/683,858, filed Mar. 1, 2022, and titled "Intelligence Driven Method and System for Multi-Factor optimization of Schedules and Resource Recommendations for Smart Construction," U.S. Provisional Application No. 63/324,715, filed Mar. 29, 2022, and titled "System and methods for intent-based factorization and computational simulation," and U.S. patent application Ser. No. 17/894,418, filed Aug. 24, 2022, and titled "System and Method for Computational Simulation and Augmented/Virtual Reality in a Construction Environment," the entire contents of which are hereby incorporated by reference for all purposes as if fully set forth herein.

FIELD OF THE INVENTION

The present disclosure relates generally to artificial intelligence driven Computer Aided Design (CAD), Computer Aided Manufacturing (CAM), use of Building Information Models (BIMs), and general construction artefacts or assemblies for construction projects. Specifically, the present disclosure relates to industrialized construction, streamlining and optimizing the design to meet an architect's design intent and optimize for manufacturing and/or assembly process of construction artefacts or assemblies for construction projects. The present disclosure is generally related to artificial intelligence (AI) and machine learning (ML) in a construction environment. In particular, the disclosure relates to the implementation and use of ML, AI, cognitive systems, self-learning, and trainable systems for intent-based factorization and computational simulation for optimal construction design and manufacturing.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Conventionally, in the construction industry, the management of construction projects has always been complex and involves optimizing a number of variables that impact the construction schedule, cost, quality, etc., of the construction projects. In particular, the management of construction projects involves consumption and/or prefabrication of several construction artefacts or assemblies for the building construction, which proves to be suboptimal in many cases. For example, materials for construction artefacts or assemblies have to be procured, transferred to a construction site, assembled, etc., which create dependencies on supply chain, labor, and other aspects that may be inefficient and lead to cost and schedule overruns, quality degradation, etc.

Software solutions may be used for every step or stage of a construction project, from planning to designing to actual construction. A final output of the software may be simulated logistics of the project and represented through a spreadsheet or a diagrammatic representation. By using the software and accessing such final output, users can understand the relationships between buildings, building materials, and other systems in a variety of situations and attempt to account for them in their decision-making processes.

However, when confronted with a multitude of diverse input, conventional solutions are unable to adapt or make decisions in real-time or near real-time to account for the dynamic nature of a construction project. In an example, parsing of a user query provided as a natural language input so as to drive the output requires an interfacing with state-of-the-art parsers such as language processors. The same rationale applies when it comes to attempting to drive the output of the software based on a user intent, which may not be an explicit but an implicit input.

As discussed above, conventional systems rely on manual and rule-based approaches (such as accepting only certain user inputs) for generating specific scenario-based outcomes. Accordingly, these conventional systems fail to comprehend dynamic variations in factors impacting construction and may fail to provide any meaningful insights or actionable guidance to improve the construction design. These problems are further compounded when factors that impact the construction schedule and design are many and varied. Some of these factors are near impractical to predict, plan, and accommodate until the factors come to pass or are likely to come to pass with some degree of certainty.

Further, the construction industry is currently built upon unique and one-off services. Services provided by professionals who interpret design intent from a series of graphical and written representations of the finished form, and then attempt to craft a resolved built form whilst developing the construction process along the way. This process involves risk, inflation, and inefficiency, thereby resulting in a built form far less resolved (complete and accurate as designed) than anything else in the world we interact with and consume in our daily lives.

Over the last few years, there has been a large focus on the adoption of BIM and how it can help increase construction productivity. However, the number of hands the information needs to pass through—from architects to project managers—in order to reach the built form is large. The information each party has in their possession during the pre-construction phase is usually misinterpreted, inaccurate, or out of date to some capacity causing major problems from end-to-end along the highly siloed and compartmentalized pre-construction process. For example, data may be misinterpreted by a quantity surveyor, an estimator, a general contractor team, subcontractors, labor services, etc., causing the built form to be mistake-ridden and a financial failure.

Furthermore, another problem with BIM interpretation and execution is that many teams struggle with efficiently modelling, coordinating, and creating the detail required to physically enforce the model intent. This leads to an extremely inefficient process consisting of specialist individuals who add their knowledge and expertise to the original design being interpreted and amended to resolve a buildable set of instructions.

When it comes to industrialized construction, this is amplified. The range of manufacturing methodologies, techniques, and machinery require an extra knowledge base which effect the overall design but also require another set of drawings and/or 3D models to create the code definition, rendering the initial design nothing more than a representation of the design intent (the hopeful end result) before the construction even begins.

Finally, there is also an issue of availability of key metrics of the supply chain at the time of design. These key metrics include project costings, bill of materials, machine code, scheduling, and logistics. As it currently stands, these metrics are not usually factored into construction of the BIM, providing a large disservice to project teams. As such, it is difficult to know what the customization entails in real time and how much it would cost, the project delivery times, and exactly how many quantities, sizes, and lead times of the material required by simply thawing a square base on a page.

Accordingly, there is a need for technical solutions that address the needs described above, as well as other inefficiencies of the state of the art. Accordingly, there is a need in the art to improve and execute construction cycles of construction projects more efficiently. In particular, there is a need for a system, an apparatus, and a method for an efficient design, manufacture, and customization of construction artefacts or assemblies for construction projects. Further, there is a need to streamline the project delivery of components. There is a need to give visibility of project outcomes to the designer in real time. There is a need to integrate the process so that more designs may be made into more accurately resolved components. There is also a need to better automate the project execution and reduce the risk of human error when reconfiguring data.

SUMMARY OF THE INVENTION

The following represents a summary of some embodiments of the present disclosure to provide a basic understanding of various aspects of the disclosed herein. This summary is not an extensive overview of the present disclosure. It is not intended to identify key or critical elements of the present disclosure or to delineate the scope of the present disclosure. Its sole purpose is to present some embodiments of the present disclosure in a simplified form as a prelude to the more detailed description that is presented below.

Embodiments of an AI-based system and a corresponding method are disclosed that address at least some of the above challenges and issues. The present disclosure improves and makes a construction cycle of a construction project more efficient by executing certain aspects or phases of the construction project off site to prefabricate several custom construction artefacts or assemblies or modules (e.g., building components such as walls, trusses, fixtures, windows, plumbing, floor components, roof components, etc.).

In an embodiment, the subject matter of the present disclosure discloses a method for simulating a product in a computing environment. The method comprises analyzing data related to a constructional representation, determining a requirement of prefabricating at least one custom construction artefact for a construction project based on the analysis of the data, determining at least one of: an intent and at least one objective associated with the at least one custom construction artefact, and enabling simulation of the at least one custom construction artefact based on the determination of the intent or the at least one objective to render a digital representation of the product in a graphical user interface.

In an embodiment of the present disclosure, analyzing the data related to the constructional representation comprises analyzing data from one or more of floor plans of the construction project, a construction schedule for the construction project, a list of associated tasks in a business process workflow for the construction project, a list of dependencies associated with the construction project, material requirements for the construction project, and labor needs for the construction project.

In an embodiment of the present disclosure, determining at least one of: the intent and the at least one objective associated with the at least one custom construction artefact is based at least on: evaluating feasibility of dissembling, shipping, and reassembling the at least one custom construction artefact to be prefabricated at a construction site.

In an embodiment of the present disclosure, the method further comprises searching a database of one or more existing construction artefacts to determine if at least one existing construction artefact similar to the at least one custom construction artefact to be prefabricated exists within the database, and triggering the simulation of the at least one custom construction artefact to be prefabricated based on determining an absence from the searching.

In an embodiment of the present disclosure, the constructional representation corresponds to an architectural or a construction drawing provided.

In an embodiment of the present disclosure, analyzing the data related to the constructional representation comprises analyzing data from one or more of: a two-dimensional architectural or a construction drawing, and a three-dimensional architectural or a construction drawing.

In an embodiment of the present disclosure, the method further comprises building the product for the construction project based at least on: computing optimal designs for manufacturing the at least one custom construction artefact that is to be prefabricated based at least on one or more of: existing construction artefacts of a prefab library, physical elements associated with the construction project, nature of construction of the construction project, geography at the construction project, and local topology related to the construction project.

In an embodiment of the present disclosure, the method further comprises outputting a set of optimal design parameters for the computed optimal designs to meet an assembly requirement of the at least one custom construction artefact to be prefabricated.

In an embodiment of the present disclosure, simulating the at least one custom construction artefact comprises providing a visual display to a user of the at least one custom construction artefact to be prefabricated, and enabling the user to execute a modification in real-time through an interface (e.g., a graphical user interface) to the at least one custom construction artefact to be prefabricated.

In an embodiment of the present disclosure, simulating the at least one custom construction artefact comprises determining whether the at least one custom construction artefact to be prefabricated is associated with a confidence score above a threshold.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
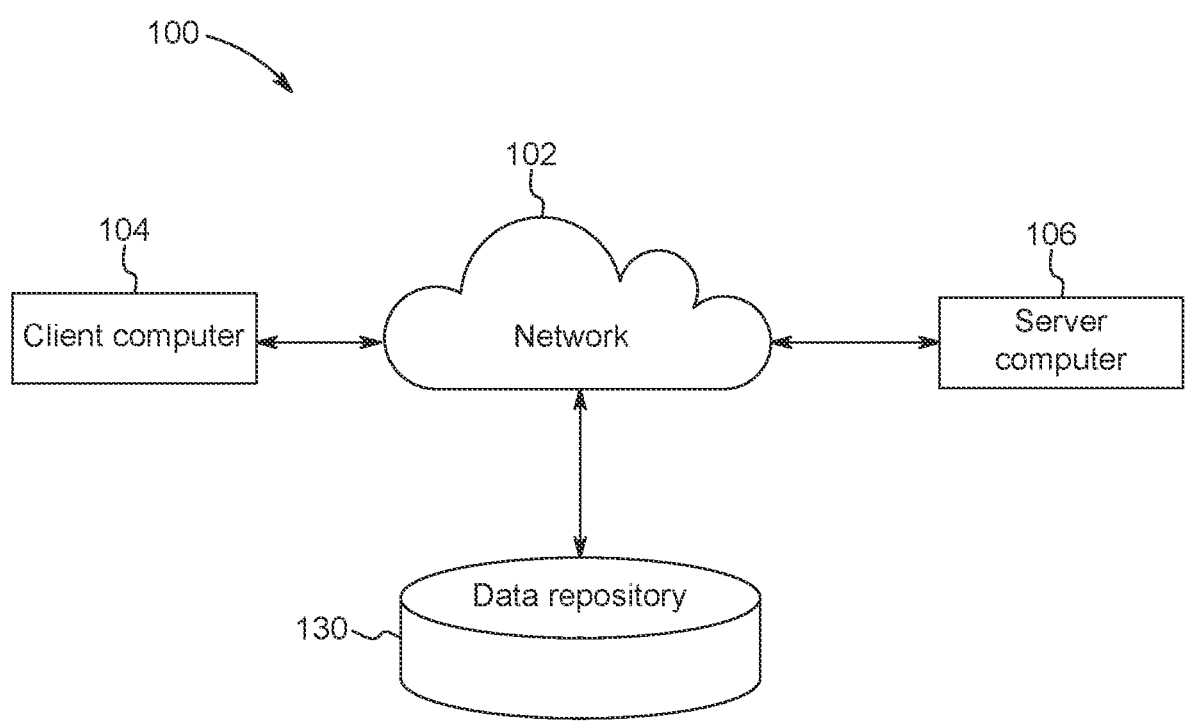
FIG. 1 illustrates an exemplary network architecture, according to an embodiment.

The following detailed description is presented to enable a person skilled in the art to make and use the disclosure. For purposes of explanation, specific details are set forth to provide a thorough understanding of the present disclosure. However, it will be apparent to one skilled in the art that these specific details are not required to practice the disclosure. Descriptions of specific applications are provided only as representative examples. Various modifications to the preferred embodiments will be readily apparent to one skilled in the art, and the general principles defined herein may be applied to other embodiments and applications without departing from the scope of the disclosure. The present disclosure is not intended to be limited to the embodiments shown but is to be accorded the widest possible scope consistent with the principles and features disclosed herein.

Embodiments are described herein in sections according to the following outline:
1.0 GENERAL OVERVIEW
2.0 STRUCTURAL OVERVIEW
3.0 FUNCTIONAL OVERVIEW
   3.1 CUSTOMIZABLE DIGITAL PRODUCT SUBSYSTEM
   3.2 FACTORY INTERFACE & DELIVERY LOGISTICS SUBSYSTEM
   3.3 MARKETPLACE SUBSYSTEM
4.0 FILE TO FACTORY SERVICE
5.0 PROCEDURAL OVERVIEW
6.0 EXAMPLE INTENT-BASED DESIGN AND COMPUTATIONAL SIMULATION FLOW
7.0 OTHER ASPECTS OF DISCLOSURE The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

1.0 General Overview

Planning any construction related activity usually involves multiple processes and implementations including generation and management of diagrammatic and digital representations of a part or whole of construction designs, associated works, and several algorithms driven planning and management of human, equipment, and material resources associated with undertaking the construction in a real-world environment. The process involves creation of digital twins (e.g., virtual representations rendered in a graphical user interface) of a construction model, and simulation of various processes and events of a construction project. For example, these aspects may include a construction schedule, work packs, work orders, sequence and timing of materials needed, procurement schedule, timing and source for procurement, etc. Additional aspects including labor, duration, dependence on ecosystem factors, topology of the construction area, weather patterns, and surrounding traffic are also considered during aforesaid creation of virtual representations. Furthermore, cost parameters, timelines, understanding and adherence to regulatory processes, and environmental factors, also play an important role in the planning.

Techniques described herein are directed to a method for simulating a product in a computing environment, which includes analyzing data related to at least a constructional representation, determining a requirement of prefabricating at least one custom construction artefact (for a construction project) related to the constructional representation based on the analysis of the data, determining at least one of: an intent or at least one objective associated with the at least one custom construction artefact, and enabling simulation of the at least one custom construction artefact based on the determination of the intent or the at least one objective to render a digital representation of the product in a graphical user interface.

In accordance with the embodiments of the invention, analyzing the data related to the constructional representation includes analyzing, with respect to the construction project, data from one or more of: a floor plan, a construction schedule, at least one task in a business process workflow, a dependency, a material requirement, and at least one laborer requirement.

In accordance with the embodiments of the invention, determining at least one of the: intent and the at least one objective associated with the at least one custom construction artefact is based at least on: evaluating feasibility of dissembling, shipping, and reassembling the at least one custom construction artefact to be prefabricated at a construction site.

In accordance with the embodiments of the invention, determining the requirement is based on searching a database of one or more existing construction artefacts to determine if at least one existing construction artefact similar to the at least one custom construction artefact exists within the database.

In accordance with the embodiments of the invention, the determination of the at least one objective and the intent for causing the simulation of the at least one custom construction artefact is based on determining an absence of the at least one existing construction artefact similar to the at least one custom construction artefact within the database.

In accordance with the embodiments of the invention, the constructional representation corresponds to an architectural or a construction drawing provided by at least building information model (BIM) data.

In accordance with the embodiments of the invention, analyzing the data related to the constructional representation includes analyzing data from one or more of: a two-dimensional architectural or a construction drawing, and a three-dimensional architectural or a construction drawing.

The present disclosure aims to make management of construction projects simple. This is achieved by improving and making a construction cycle of a construction project more efficient, for example, by routing or executing certain aspects of the construction project off site from an actual site so as to prefabricate several custom construction artefacts (e.g., building components such as walls, trusses, fixtures, windows, plumbing, floor components, roof components, etc.) when such prefabrication is feasible.

Various embodiments of the methods and systems are described in more detail with reference to FIGS. 1-9. Other embodiments, aspects, and features will become apparent from the reminder of the disclosure as a whole.

Certain terms and phrases have been used throughout the disclosure and will have the following meanings in the context of the ongoing disclosure.

The term "construction project", as used herein and sometimes just referred to as a "project", may refer to the organized process of constructing, renovating, refurbishing, etc., a building, structure, or infrastructure. The project process may typically start with an overarching requirement which is developed through the creation of brief feasibility studies, option studies, design, financing, and construction.

The term "Customizable Digital Product (CDP)", as used herein, may refer to a parametric component that has been developed to have restrictions and parameters of exactly what is achievable with an associated supply chain team. The term "product" may be used interchangeably with the word "item" without departing from the scope of the disclosure.

The term "Building Information Model (BIM)", as used herein, may refer to an entity and process supported by various tools, technologies, and contracts involving the generation and management of digital representations of physical and functional characteristics of a building structure. BIMs may be computer generated files (often but not always in proprietary formats and containing proprietary data) which may be extracted, exchanged, or networked to support decision-making regarding a built asset. Further, BIM software may be used by individuals, businesses, and government agencies who plan, design, construct, operate, and maintain buildings and diverse physical infrastructures, such as water, refuse, electricity, gas, communication utilities, roads, railways, bridges, ports, and tunnels. BIM data may include dimensional data (e.g., 2 to 6 or more dimensions) of a building component, spatial information, material information, sectional views, elevation and aerial views, floor plans, foundations, and the like. Dimensional data of a building component may be included as part of a BIM model.

The term "construction artefacts", as used herein, may refer to objects produced or shaped by human craft, and may be related to construction industry. The term "construction artefacts" may be used interchangeably with the term "construction assemblies" or the term "construction modules" without departing from the scope of the disclosure. Example construction artefacts are building components such as walls, trusses, fixtures, windows, plumbing, floor components, roof components, etc.

The term "database", as used herein, may refer to an organized collection of structured information, or data, typically stored electronically in a computer system. The term "database" may be used interchangeably with the word "library" without departing from the scope of the disclosure.

The term "supply chain team", as used herein, may refer to the people and functions required to transform the design into a physical product. A non-limiting list of functions include manufacturers, assemblers, purchasers, raw material suppliers, and cost estimators.

A "network" may refer to a series of nodes or network elements that are interconnected via communication paths. In an example, the network may include any number of software and/or hardware elements coupled to each other to establish the communication paths and route data/traffic via the established communication paths. In accordance with the embodiments of the present disclosure, the network may include, but are not limited to, the Internet, a local area network (LAN), a wide area network (WAN), an Internet of things (IoT) network, and/or a wireless network. Further, in accordance with the embodiments of the present disclosure, the network may comprise, but is not limited to, copper transmission cables, optical transmission fires, wireless transmission, routers, firewalls, switches, gateway computers, and/or edge servers.

A "device" may refer to an apparatus using electrical, mechanical, thermal, etc., power and having several parts, each with a definite function and together performing a particular task. In accordance with the embodiments of the present disclosure, a device may include, but is not limited to, one or more IoT devices. Further, one or more IoT devices may be related, but are not limited to, connected appliances, smart home security systems, autonomous farming equipment, wearable health monitors, smart factory equipment, wireless inventory trackers, ultra-high speed wireless internet, biometric cybersecurity scanners, and shipping container and logistics tracking.

A "processor" may include a module that performs the methods described in accordance with the embodiments of the present disclosure. The module of the processor may be programmed into the integrated circuits of the processor, or loaded in memory, storage device, or network, or combinations thereof.

"Machine learning" may refer to as a study of computer algorithms that may improve automatically through experience and by the use of data. Machine learning algorithms build a model based at least on sample data, known as "training data," in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

In machine learning, a common task is the study and construction of algorithms that can learn from and make predictions on data. Such algorithms function by making data-driven predictions or decisions, through building a mathematical model from input data. These input data used to build the model are usually divided in multiple data sets. In particular, three data sets are commonly used in various stages of the creation of the model: training, validation, and test sets. The model is initially fit on a "training data set," which is a set of examples used to fit the parameters of the model. The model is trained on the training data set using a supervised learning method. The model is run with the training data set and produces a result, which is then compared with a target, for each input vector in the training data set. Based at least on the result of the comparison and the specific learning algorithm being used, the parameters of the model are adjusted. The model fitting can include both variable selection and parameter estimation.

Successively, the fitted model is used to predict the responses for the observations in a second data set called the "validation data set." The validation data set provides an unbiased evaluation of a model fit on the training data set while tuning the model's hyperparameters. Finally, the "test data set" is a data set used to provide an unbiased evaluation of a final model fit on the training data set.

Machine learning models disclosed herein may include appropriate classifiers and ML methodologies. Some of the ML algorithms include (1) Multilayer Perceptron, Support Vector Machines, Bayesian learning, K-Nearest Neighbor, or Naive Bayes as part of supervised learning, (2) Generative Adversarial Networks as part of Semi Supervised learning, (3) Unsupervised learning utilizing Autoencoders, Gaussian Mixture and K-means clustering, and (4) Reinforcement learning (e.g., using a 0-learning algorithm, using temporal difference learning), and other suitable learning styles. Knowledge transfer is applied, and, for small footprint devices, Binarization and Quantization of models is performed for resource optimization for ML models. Each module of the plurality of ML models can implement one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomize 3, C4.5, chi-squared automatic interaction detection, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Eclat algorithm, etc.), an artificial neural network model (e.g., a Perceptron method, a back-propagation method, a self-organizing map method, a learning vector quantization method, etc.), a deep learning algorithm (e.g., a restricted Boltzmann machine, a deep belief network method, a convolution network method, a stacked autoencoder method, etc.), and a dimensionality reduction method (e.g., principal component analysis, partial least squares regression, multidimensional scaling, etc.). Each processing portion of system 100 of FIG. 1 can additionally leverage: a probabilistic, heuristic, deterministic or other suitable methodologies for computational guidance, recommendations, machine learning or combination thereof. However, any suitable machine learning approach can otherwise be incorporated in the system. Further, any suitable model (e.g., machine learning, non-machine learning, etc.) can be used in the system of the present disclosure.

The embodiments of the present disclosure are described in more detail with reference to FIGS. 1-9.

2.0 Structural Overview

FIG. 1 illustrates an example networked computer system 100 with which various embodiments of the present disclosure may be implemented. FIG. 1 is shown in simplified, schematic format for purposes of illustrating a clear example and other embodiments may include more, fewer, or different elements. FIG. 1 and the other drawing figures, and all of the description and claims in this disclosure are intended to present, disclose and claim a technical system and technical methods. The technical system and methods as disclosed includes specially programmed computers, using a special-purpose distributed computer system design and instructions that are programmed to execute the functions that are described. These elements execute to provide a practical application of computing technology to the problem of optimizing schedule, resource allocation, and work sequencing for planning and execution. In this manner, the current disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some embodiments, the networked computer system 100 may include a client computer(s) 104, a server computer 106, and a data repository(ies) 130, which are communicatively coupled directly or indirectly via a network 102. In an embodiment, the server computer 106 broadly represents one or more computers, such as one or more desktop computers, server computers, a server farm, a cloud computing platform, a parallel computer, virtual computing instances in public or private datacenters, and/or instances of a server-based application. The server computer 106 may be accessible over the network 102 by the client computer 104, for example, to request a schedule or a resource recommendation and to make a query. The client computer 104 may include a desktop computer, laptop computer, tablet computer, smartphone, or any other type of computing device that allows access to the server computer 106. The elements in FIG. 1 are intended to represent one workable embodiment but are not intended to constrain or limit the number of elements that could be used in other embodiments.

Figure 2:
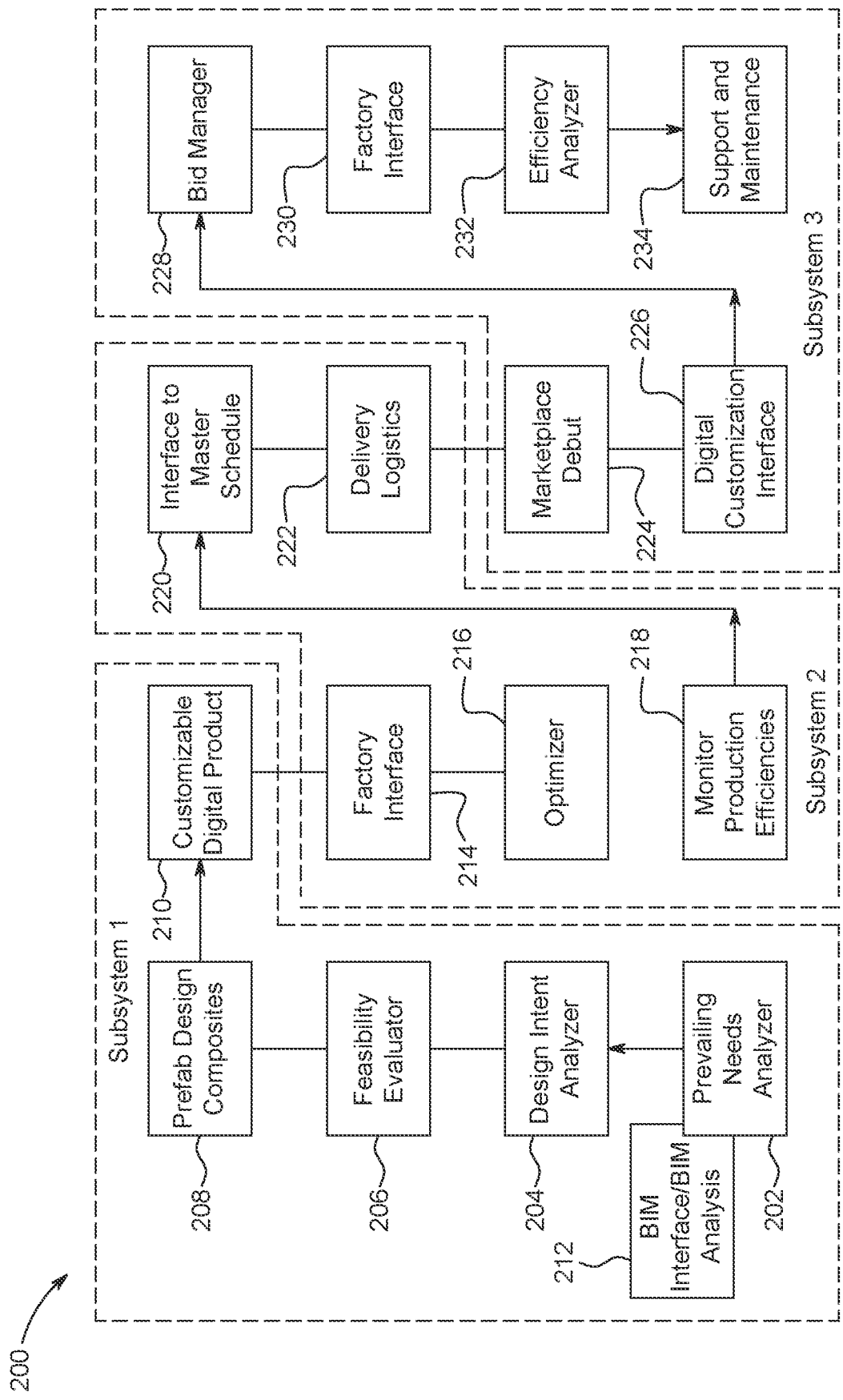
FIG. 2 illustrates an exemplary computing system to design, manufacture, and customize construction artefacts or assemblies for a construction project, according to an embodiment.

The server computer 106 may include one or more computer programs or sequences of program instructions in organization. Such organization implements artificial intelligence/machine learning algorithms to generate data pertaining to various requirements, such as design consideration factors in a construction project, controlling functions, notifying functions, monitoring functions, and modifying functions. A set of diverse or even mutually exclusive programs or sequences of instructions are organized together to implement diverse functions to generate data associated with design consideration factors. Such set may include Subsystem 1, Subsystem 2, and Subsystem 3, as illustrated in FIG. 2. In some embodiments, in keeping with sound software engineering principles of modularity and separation of functions, the Subsystem 1, Subsystem 2, and Subsystem 3 are each implemented as a logically separate program, process, or library. They may also be implemented as hardware modules or a combination of both hardware and software modules without limitation.

In an embodiment, the networked computer system 100 may be an AI system and may include the client computer 104, the server computer 106, and the data repository 130 that are communicatively coupled to each other via the network 102. An example AI-based system is described in U.S. Provisional Application No. 63/280,881, filed Nov. 18, 2021, and titled "Method and System for Multi-Factor Optimization of Schedules and Resource Recommendations for Smart Construction Utilizing Human and Machine Cognition," U.S. patent application Ser. No. 17/683,858, filed Mar. 1, 2022, and titled "Intelligence Driven Method and System for Multi-Factor optimization of Schedules and Resource Recommendations for Smart Construction," U.S. Provisional Application No. 63/324,715, filed Mar. 29, 2022, and titled "System and methods for intent-based factorization and computational simulation," and U.S. patent application Ser. No. 17/894,418, filed Aug. 24, 2022, and titled "System and Method for Computational Simulation and Augmented/Virtual Reality in a Construction Environment," the entire contents of which are hereby incorporated by reference for all purposes as if fully set forth herein. In an embodiment, one or more components of the server computer 106 may include a processor configured to execute program instructions stored in a non-transitory computer readable medium.

Computer executable instructions described herein may be in machine executable code in the instruction set of a CPU and may be compiled based upon source code written in Python, JAVA, C, C++, OBJECTIVE-C, or any other human-readable programming language or environment, alone or in combination with scripts in JAVASCRIPT, other scripting languages and other programming source text. In another embodiment, the programmed instructions may also represent one or more files or projects of source code that are digitally stored in a mass storage device such as non-volatile RAM or disk storage, in the systems of FIG. 1 or a separate repository system, which when compiled or interpreted cause generation of executable instructions that in turn upon execution cause the computer to perform the functions or operations that are described herein with reference to those instructions. In other words, the figure may represent the manner in which programmers or software developers organize and arrange source code for later compilation into an executable, or interpretation into bytecode or the equivalent, for execution by the server computer 106.

The server computer 106 may be communicatively coupled to the data repository 130. The data repository 130 includes a prefab database and a design database. In an embodiment, the prefab database may store data relating to existing factory prefabricated construction artefacts previously generated, and the design database may store data relating to design elements. The data repository 130 may include additional databases that may be used by the server computer 106. Such databases are described in the above-mentioned applications that are incorporated by reference for all purposes as if fully set forth herein. Each database may be implemented using memory, e.g., RAM, EEPROM, flash memory, hard disk drives, optical disc drives, solid state memory, or any type of memory suitable for database storage.

3.0 Functional Overview

FIG. 2 illustrates an exemplary computing system 200 to design, manufacture, and customize construction artefacts (also referred to as construction assemblies or construction modules) for a construction project, according to an embodiment. The computing system 200 may be referred herein to as a product-simulation system. In an embodiment, the server computer 106 is similarly configured as the computing system 200. As illustrated in FIG. 2, the computing system 200 may include, but is not limited to, a CDP Subsystem (indicated as Subsystem 1 in FIG. 2), a Factory Interface and Delivery Logistics Subsystem (indicated as Subsystem 2 in FIG. 2), and a Marketplace Subsystem (indicated Subsystem 3 in FIG. 2). The subsystems of the computing system 200 interoperate in an unconventional manner, depending on use requirements, to improve and make a construction cycle of a construction project more efficient.

3.1 Customizable Digital Product Subsystem

In an embodiment, the CDP Subsystem may include, but is not limited to, a Prevailing Needs Analyzer module 202, a Design Intent Analyzer module 204, a Feasibility Evaluator module 206, a Prefab Design Composites module 208, and a CDP module 210. Each of these modules may implement one or more AI/ML techniques described herein.

In an embodiment, the Prevailing Needs Analyzer module 202 may analyze BIM data including drawings of buildings/floor plans associated with one or more construction projects. An example drawing may be a two-dimensional architectural or a construction drawing, or a three-dimensional architectural or a construction drawing provided by the BIM data. The BIM data, as input data, may be received via a BIM interface 212 of Subsystem 1. For example, the BIM interface 212 may have the ability to consume/receive multiple BIM models and multiple versions of the BIM models and retain the context for downstream processing. The BIM interface 212 may receive input BIM data from user input and/or the data repository 130 of FIG. 1.

In an embodiment, the Prevailing Needs Analyzer module 202 may perform analysis on one or more of: floor plans of the one or more construction projects related to the buildings/floor plans, a construction schedule for the one or more construction projects, a list of associated tasks in business process workflow for the one or more construction projects, a list of dependencies associated with the one or more construction projects, material requirements for the one or more construction projects, and labor needs for the one or more construction projects. In some embodiments, the Prevailing Needs Analyzer module 202 may perform the analysis using one or more AI and/or ML algorithms. Furthermore, the Prevailing Needs Analyzer module 202 may compute, from the input BIM data, a plurality of custom construction artefacts for the one or more construction projects, and may further compute time, material, and labor costs for on-site manufacture and assembly of materials related to the one or more construction projects. In an embodiment, the Prevailing Needs Analyzer module 202, when computing the plurality of custom construction artefacts, may refer to system objectives and/or environmental considerations—for example, the system objective may be to finish the one or more construction projects within certain timelines. Other system objectives may also be possible. Further, environmental considerations may include, but not limited to, if the structure to be built over a shallow waterway, withstand sub-zero temperatures, high humidity, heavy floor traffic, heavy vehicle traffic, carbon limits and the like. Example construction artefacts are building components such as walls, trusses, fixtures, windows, plumbing, floor components, roof components, etc.

Additionally, the Prevailing Needs Analyzer module 202 may determine whether one or more custom construction artefacts of the plurality of custom construction artefacts for the one or more construction projects are to be prefabricated and may further evaluate if prefabrication of the one or more custom construction artefacts for the one or more construction projects will be beneficial (in terms of time and cost, as an example). AI and ML may be used by the Prevailing Needs Analyzer module 202 to know what the customization (of the one or more construction artefacts) entails in real time (using one or more training data sets related to the one or more construction artefacts) and how much it would cost, the project delivery times, and exactly how many quantities, sizes, and lead times of the material (for the one or more construction artefacts) may be required. Further, the Prevailing Needs Analyzer module 202 may comprehend the dynamic variations in factors impacting construction of one or more custom construction artefacts and may provide meaningful insights or actionable guidance to improve ways of designing and manufacturing the one or more custom construction artefacts. In some embodiments, the Prevailing Needs Analyzer module 202 may perform the evaluation using one or more computational algorithms including but not limited to AI and/or ML algorithms, Bruteforce algorithms, Greedy algorithms, Backtracking algorithms, and/or Recursive algorithms. As an example, if offsite manufacturing or procurement of certain construction artefacts is a viable option in terms of time, quality, and cost, models of, the one or more computational algorithms of the Prevailing Needs Analyzer module 202 may indicate a need for factory prefabricated custom construction artefacts. In some embodiments, the one or more computational algorithms (including at least the AI and/or ML algorithms) may be designed to take into consideration, factors (that may impact the construction schedule and design) that are near impractical to predict, plan, and accommodate until the factors come to pass or are likely to come to pass with some degree of certainty. In some embodiments, the computing system 200 identifies elements of a custom construction artefact that may be prefabricated.

Additionally, the Prevailing Needs Analyzer module 202 may check the prefab library to see whether any of the factory prefabricated custom construction artefacts already exist in the prefab library. For example, in response to determining that the one or more custom construction artefacts for the one or more construction projects are to be prefabricated, the Prevailing Needs Analyzer module 202 may check the prefab library to determine whether one or more existing construction artefacts similar to the one or more custom construction artefacts for the one or more construction projects exist in the prefab library. In an embodiment, the one or more existing construction artefacts are similar to the one or more custom construction artefacts for the one or more construction projects existing in the prefab library at least when they both have a number of properties in common and/or when they both have a number of characteristics in common. Examples of properties may include, but not limited to, one or more of physical properties, mechanical properties, chemical properties, electrical properties, magnetic properties, and thermal properties related to the construction artefacts. Examples of the characteristics may include, but not limited to, one or more of abundance in nature, cost, easy to make and repair, age (wear and tear), shape, dimensions, and temperature in different seasons.

Additionally, the Prevailing Needs Analyzer module 202 may recommend one or more existing construction artefacts, different from the one or more custom construction artefacts to be prefabricated, in response to determining that no existing construction artefacts similar to the one or more custom construction artefacts of the one or more construction projects, exist in the prefab library. In an example, if none of the existing construction artefacts are similar to the one or more custom construction artefacts of the one or more construction projects, the computing system 200 may recommend one or more existing prefabricated artefacts that are comparable and accommodate for the identification of the nearest fit for the present requirements. In an embodiment, identification of the nearest fit for the present requirements may at least include identifying one or more existing construction artefacts that are comparable (e.g., could be considered similar, by a predetermined amount with respect to one or more properties (as discussed above) and/or one or more characteristics (as discussed above), to the one or more custom construction artefacts). In some embodiments, the nearest fit can refer to a recommendation that tries to factor in the prevailing needs, user intents, spatial and geographic considerations and tries to look into a system knowledge store for comparable artifact/information to be present to include in the recommendation. The nearest fit may then be presented to a user for customization such that designs of construction artefacts may be reused. In some embodiments, one or more AI and/or ML algorithms may be used to identify the nearest fit for the present requirements.

Additionally, the Prevailing Needs Analyzer module 202 may design reusable construction artefacts. In an embodiment, the computing system 200 may auto compose designs of the reusable construction artefacts based at least on preset specifications. In an example, for a window panel having dimensions 4 ft by 6 ft with steel rails, the computing system 200 may present few prefabricated designs and may custom make few designs based at least on the BIM data. Further, the Prevailing Needs Analyzer module 202 may not only present few prefab designs but also indicate how an assembly of the window panel may be performed from a configuration perspective of a construction process. Further, in an embodiment, the preset specifications may be related, but not limited to, one or more of nature, cost, easy to make and repair, age (wear and tear), shape, dimensions, and temperature in different seasons, of the construction artefacts.

In an embodiment, the Prevailing Needs Analyzer module 202 may recommend a subset of tasks related to the one or more construction projects be routed or executed offsite and brought into construction site at specific points in time during construction phase of the one or more construction projects. Further, the Prevailing Needs Analyzer module 202 may recommend an optimized construction schedule for a construction project based at least on the analyzed data.

In summary, once the Prevailing Needs Analyzer module 202 analyzes its input data, the computing system 200 may introspect the data and output a set of tasks that optimize construction schedule for the one or more construction projects, business process workflows to manage the one or more construction projects, etc. As an example, if a construction project involves window panels (there may be many window panels in a large commercial building), the computing system 200 may recommend that instead of getting raw material and then assembling the window panels with labor onsite, it may be preferable to prefabricate the requisite window panels offsite and thereafter transport them onsite. Further, even if the prevailing assembled window panels are absent, the computing system 200 may additionally recommend a way to fabricate such window panels and cater to the construction project needs.

In an embodiment, the Design Intent Analyzer module 204 may evaluate human and physical intent of arriving at a physical design of the plurality of custom construction artefacts for the one or more construction projects. For example, the Design Intent Analyzer module 204 may evaluate that the intent may be to save time and costs or otherwise to reduce a number of contractors onsite (and thereby reduce work-place liability). In an embodiment, the Design Intent Analyzer module 204 may perform intent analysis to determine an intent or a set of objectives for the one or more custom construction artefacts that are to be prefabricated. Further, in an alternative or additional embodiment, the Design Intent Analyzer module 204 may perform intent analysis, to determine an intent or a set of objectives for the one or more custom construction artefacts that are to be prefabricated, in response to a query (input) from a user. Objective and intent may be related and usually are to be directionally aligned. As an illustration, an objective may be to finish the project on a specific timeline, and intent in this case may be to enable to accommodate a window frame of certain dimension. This can be design intent and, in which case, more than one option will exist to support the design intent.

Further, the Design Intent Analyzer module 204 may translate the intent for the one or more custom construction artefacts to designs for the one or more custom construction artefacts by using the design library. In particular, once the intent is determined, for a particular custom construction artefact, or a task, or a business process workflow, etc., the computing system 200 may query the design library and verify if the intent may be correlated to design element(s) already available in the design library, and output a set of recommendations for optimizing designs of the custom construction artefacts to meet a criteria defined by the intent or the set of objectives. Design elements may be, for example, steel window frames of certain design, bathroom pods of specific dimension and so on.

Furthermore, the Design Intent Analyzer module 204 may provide human interface facilitation for designing the one or more custom construction artefacts. For example, a user interface (e.g., a graphical user interface) may be provided on a client device 104 to enable a user to provide inputs for optimal designs for manufacturing the one or more custom construction artefacts that are to be prefabricated. Further, a visual display may be provided to the user (e.g., rendered on a client device 104) to enable physical product simulation of at least the one or more custom construction artefacts that are to be prefabricated. The physical product simulation may enable the user to visualize a physical product that is taking shape. Further, providing the visual display to the user may further enable visual modifications of the physical product that is being configured. In an embodiment, the Design Intent Analyzer module 204 may operate as at least a part of a rendering unit enabling simulation of at least the one or more custom construction artefacts based on the determination of the intent for the one or more custom construction artefacts or at least one objective to render a digital representation of the physical product in the user interface (e.g., a graphical user interface). It is noted that the rendering unit may also include other modules described herein.

Additionally, the Design Intent Analyzer module 204 may compute optimal designs for the one or more custom construction artefacts to meet the set objectives. In an embodiment, optimal designs for manufacturing the one or more custom construction artefacts that are to be prefabricated may be computed based at least on one or more of: existing construction artefacts of the prefab library, physical elements associated with the one or more construction projects, nature of construction of the one or more construction projects, geography at the one or more construction projects, and local topology related to the one or more construction projects. An optimal design, for example, may factor in physical elements of a custom construction artefact, a topology of an area where the custom construction artefact is going to be installed, a purpose of the custom construction artefact (e.g., is it function or aesthetic), and recommendations, for example, may include a material to be used to build/fabricate the custom construction artefact, etc. Further, a set of optimal design parameters may be outputted for the computed optimal designs to meet assembly requirements of the one or more custom construction artefacts that are to be prefabricated. In some embodiments, one or more AI and/or ML algorithms may be used to compute optimal designs for the one or more custom construction artefacts to meet the set objectives.

In an example, the Design Intent Analyzer module 204 may be configured to derive a user specific intent from the natural language (NL) based content from the provided user query (input) and prevailing factors such as timeline of the construction project. In some examples, the user query (input) may be provided via the BIM Interface 212. Further, in some examples, the user query (input) may be provided to the Design Intent Analyzer module 204 prior to analyzing the BIM data. Further, in some examples, the user query (input) may be related to (i) Providing optioneering for vertical hold structure of the construction project to fit in 50 by 50 inch substructure (of the construction project): Can the vertical hold structure be sliced into 3 vertical hold outs? What if the vertical hold structure is split up horizontally? and/or (ii) Generating a shallow waterway optimal design for an overview bridge: Overview a bridge waterway structure to stand corrosive influences? What possible outcomes that may be obtained if a girder is hanged from a third floor of the structure? Can an angled bracket tied to the structure at higher elevation make the structure withstand speeds of 10 mph (as an example), Can an elevation bracket integrated with the structure make the structure withstand wind gust upwards 10 mph? In some examples, the user specific intent may be derived at least by inferring the construction project demographics—location, temperature, topography, soil, elevation, foot traffic, current design if present and more and by correlating the inference to the user query (input). In some examples, the user query whether spoken or written may be internalized as written natural language queries and are interpreted by tokenizing operations, i.e., breaking user input into words using tokenization technique of space characters. Thereafter, as a part of normalization operation, non-standard words are converted to standard words. This may be achieved using text simplification techniques or other predefined techniques. In some examples, the normalized text obtained may not be merely phrasal. In such cases, the normalized text may include contextual connotations and the combination of all of that is what the Design Intent Analyzer module 204 will translate into the appropriate machine relatable queries. An intent may then be obtained from the normalized text through various techniques such as unsupervised learning, dimensionality reduction or clustering. Such techniques may be technically referred by a NMF (Non-negative Matrix Factorization), LSA (Latent Semantic Analysis), LDA (Latent Dirichlet Allocation) etc. In some embodiments, one or more AI and/or ML algorithms may be used to derive the user specific intent and/or the objective(s) associated with one or more construction artefacts.

In an embodiment, the Feasibility Evaluator module 206 may evaluate the feasibility of building a physical product assembly that includes the plurality of custom construction artefacts. In an embodiment, the Feasibility Evaluator module 206 may evaluate feasibility of dissembling, shipping, and reassembling the one or more custom construction artefacts that are to be prefabricated and brought to one or more construction sites of the one or more construction projects. In an embodiment, the Feasibility Evaluator module 206 may be provided inputs on the feasibility of dissembling, shipping, and reassembling the one or more custom construction artefacts, from an external information source. Further, in an embodiment, the Feasibility Evaluator module 206 may be provided with data relating to cost objectives related to the feasibility of building the physical product assembly. In such a scenario, the Feasibility Evaluator module 206 factors in the provided cost objectives when evaluating the feasibility of building the physical product assembly. In an embodiment, a determination may be made as to how much amount of money and/or resources would a construction company save upon building the physical product assembly. Further, in an embodiment, the Feasibility Evaluator module 206 may be provided with data relating to economies of scale related to the feasibility of building the physical product assembly. In such a scenario, the Feasibility Evaluator module 206 may also factor in economies of scale while evaluating the feasibility of building the physical product assembly. In an embodiment, a determination may be made as to how many physical product assemblies are needed to break even and obtain profit. Further, the Feasibility Evaluator module 206 may present a feasibility score and a confidence score, optionally. The feasibility and confidence scores are computed using a multifactorial computation by factoring BIM, design intent, and prevailing needs. The score will be a numerical range up to 100 in terms of viability of the solution. The confidence score is a measure of systems recommendation based on ML and current situational factors. For example, the feasibility score may factor in number of stories of the building, ecology of the ground, type of material used to construct, cost and timeline factors, and additional inputs mandated through design intent of the user. The scores may be related at least to the physical product assembly. In an embodiment, the Feasibility Evaluator module 206 may determine whether the one or more custom construction artefacts may be prefabricated with a confidence score above a feasibility threshold. For example, the feasibility threshold can be set by a system administrator (or user) to be above 95% and a confidence score of about 90%.

In summary, the Feasibility Evaluator module 206 may determine the practicality of achieving construction project objectives, for example, of completing the construction project on time, within budget, etc. The Feasibility Evaluator module 206 may evaluate the feasibility of accomplishing a process output by the Design Intent Analyzer module 204, for example, dissembling, shipping, and reassembling a prefabricated artefact manufactured offsite and brought to a project site in a timely and cost-effective manner. The Feasibility Evaluator module 206 may also determine if there are economies of scale of manufacturing an artefact offsite (e.g., can the design or manufacturing set up be reused for a different project and so forth) to break even or profitability, etc. The Feasibility Evaluator module 206 may then output a feasibility score, which may also include a confidence score, of executing a specific process output by the Design Intent Analyzer module 204 having regard to availability of raw materials, supply chain information, labor utilization information, and other such factors.

In an embodiment, the Prefab Design Composites module 208 may compute optimal designs to meet the set objectives for the physical product assembly. The Prefab Design Composites module 208 may compute optimal designs for the manufacture of the one or more custom construction artefacts by factoring in physical elements, nature of the construction, geography, local topology, etc., and may output a set of optimal design parameters to meet the assembly requirements, etc. The optimal design parameters may also factor in data from BIM introspection, existing design library data, and material and environmental constraints. The Prefab Design Composites module 208 may include a user interface (e.g., a graphical user interface) to facilitate user inputs for design of the one or more custom construction artefacts. In an embodiment, the user inputs may be related to one or more properties (as discussed above) and/or one or more characteristics (as discussed above) of the one or more custom construction artefacts. Thus, an optimal design output from the Prefab Design Composites module 208 may enable the computing system 200 to calibrate, customize, and configure design elements of the one or more custom construction artefacts to meet the overall construction objectives. In an embodiment, the Prefab Design Composites module 208 may operate as at least a part of a design generator unit enabling computation of optimal designs. It is noted that the design generator unit may also include other modules described herein.

In an embodiment, the CDP module 210 may create and enable design and manufacture of CDPs. The physical products are not mere one-off composition but are generated with a view to creating a reusable set of libraries which may be used for other construction projects based on a type of construction, a prevailing need, etc. The CDPs are usually correlated to the needs analyzed from the BIM data and are digital artefacts based on which physical products are built out. The digital artefacts lend themselves for customization (e.g., color, dimensions, design intent, etc.). In an embodiment, the CDP module 210 uses visual constraints to enable product simulation and allows a user to visualize a physical product taking shape and provide the ability to introspect and visually modify the physical product that is being configured. The CDP module 210 may interface with three dimensional BIM models and may allow users to interact and query attributes, spatial definitions, elements, their properties as defined in a BIM model in a real-time visually enhanced user interface so as to allow further customizations and modifications of the CDPs. In an embodiment, a user may query a BIM model by playing around with properties and characteristics of the BIM model, and seeing the output based on the changes made to the BIM model. For example, the user may change the color, shape, material, and dimension of the CDPs, and visually see the impact of the changes on the three-dimensional BIM models. The CDP module 210 may also provide feedback on whether a proposed modification of a physical product is feasible from design, utility, and overall construction objective perspectives as well. The CDP module 210 may output a digital twin of a construction artefact along with distinct options and information on cost, time to manufacture, ease of manufacture, etc.

The creation and enablement of the design and manufacture of CDPs unlocks a new potential of Industrialized Construction (IC) through development of a strategy and approach to achieve a two-way data flow among designers, suppliers, manufacturers, and assemblers. The CDPs enable automation and also result in streamlining project delivery of a customized physical product from design of the physical product through manufacture and/or assembly of the physical product.

In an embodiment, a File to Factory (F2F) service may be hosted by the computing system 200. Briefly here, the F2F service streamlines design through manufacturer and/or assembly of physical products. Details of the F2F service is further discussed herein.

3.2 Factory Interface & Delivery Logistics Subsystem

The Factory Interface and Delivery Logistics subsystem (Subsystem 2) may include, but is not limited to, a Factory Interface module 214, an Optimizer module 216, a Monitor Production Efficiencies module 218, an Interface to Master Schedule module 220, and a Delivery Logistics module 222. Each of these modules may implement one or more AI/ML techniques described herein.

In an embodiment, once the computing system 200 determines that the one or more custom construction artefacts may be manufactured/prefabricated with a confidence score above a feasibility threshold, the Factory Interface module 214 generates an optimal manufacturing process workflow. Optionally, the computing system 200 may seek an approval from a user prior to generating the optimal manufacturing process workflow (e.g., via a user interface). In an embodiment, the optimal manufacturing process workflow takes into consideration, among others, sourcing information, material availability, supply-chain considerations, etc., to create customized factory manifests for manufacturing the custom construction artefacts. These may include a sequence in which certain components or products need to be manufactured in coordination with construction schedule and project status. The manufacturing schedule (associated with the timeline of manufacturing the one or more custom construction artefacts) may feed into over a construction master schedule manager (associated with the timeline of completion of the whole construction project) to ensure that the prefabricated products are manufactured in the right sequence at the right time to keep the construction project on track.

In an embodiment, the Factory Interface module 214 may optionally include a supplier interface to coordinate sourcing of materials in accordance with the manufacturing schedule. The Factory Interface module 214 may determine and dynamically source the material from a specific supplier depending on availability, cost, and other project considerations. The Factory Interface module 214 may manage the overall process workflow of the custom construction artefacts thus relieving the factories of scheduling, stocking, and procurement issues and delivery logistics.

Thus, the Factory Interface module 214 may create factory manifests and determine sequence in which the custom construction artefacts need to get manufactured. Further, the Factory Interface module 214 may act as an interface to construction material supplier systems, and may have an ability to interface with factor schedules at least by means of communicating with the construction master schedule manager.

In an embodiment, the Optimizer module 216 may be an interactive module that determines how to optimally manufacture the custom construction artefacts. In an embodiment, the computing system 200 may have a list of raw material suppliers and also have a list of factories (e.g., stored in the data repository 130, in some embodiments). The raw material suppliers may provide the raw materials required to build or manufacture the construction artefacts, whereas the factories may be places where the custom construction artefacts are actually built or manufactured. The Optimizer module 216 may provide information to the factories on the optimal way to manufacture the custom construction artefacts. The optimal way to manufacture the custom construction artefacts may be related at least to the manufacturing schedule. Further, in an embodiment, if the Optimizer module 216 senses a delay in manufacturing the custom construction artefacts at one or more factories, the Optimizer module 216 may provide one or more recommendations on how to complete the construction project on the planned deadline without any delay. In an embodiment, in order to sense the delay in manufacturing the custom construction artefacts at one or more factories, the Optimizer module 216 may be provided a real time feed from one or more raw material suppliers and/or one or more factories. In particular, the Optimizer module 216 may enable completion of the construction project on the planned deadline.

In an embodiment, the Monitor Production Efficiencies module 218 may monitor efficiencies related to the manufacture of the custom construction artefacts. For example, the monitored efficiencies may or may not be related to efficiencies of the one or more factories in which the custom construction artefacts are manufactured or are in the process of getting manufactured. Further, in an example, the monitored efficiencies may be related to efficiencies of one or more raw material suppliers which provide raw materials for manufacturing the custom construction artefacts. In general, the monitored efficiencies may be related to efficiencies of one or more modules of the computing system 200 and/or to one or more processes involved during the building of a construction project. In an embodiment, in order to monitor efficiencies related to the manufacture of the custom construction artefacts, the Monitor Production Efficiencies module 218 may be provided a real time feed from one or more raw material suppliers and/or one or more factories.

In an embodiment, the Interface to Master Schedule module 220 may perform adjustments to the timelines associated with the various stages of building a construction project. Said adjustments may be necessitated at least because of one or more avoidable and/or unavoidable delays at the one or more factories in which the custom construction artefacts are manufactured or are in the process of getting manufactured.

In an embodiment, the Delivery Logistics module 222 may provide suggestions, outcomes, and deadlines regarding delivery of work products at each and every stage (phase) of the construction process of a construction project. In an embodiment, the Delivery Logistics module 222 may output timelines regarding the completion of each and every stage (phase) of the construction process well in advance before the completion of the respective stages (phases) of the construction process.

3.3 Marketplace Subsystem

Furthermore, in an embodiment, the Marketplace subsystem (Subsystem 3) may include, but is not limited to, a Marketplace Debut module 224, a Digital Customization Interface module 226, a Bid Manager module 228, a Factory Interface module 230, an Efficiency Analyzer module 232, and a Support and Maintenance module 234. Each of these modules may implement one or more AI/ML techniques described herein.

In an embodiment, the Marketplace Debut module 224 together with the Digital Customization Interface module 226 and the Bid Manager module 228 may provide a digital construction elements' design marketplace for construction related digital artefacts, a digital customization platform to customize the readily available CDPs, and a platform to support bidding on customization of the CDPs. A database for CDPs may be provided by the computing system 200. Further, the Marketplace Debut module 224 (optionally with the Digital Customization Interface module 226 and/or the Bid Manager module 228) may provide an ability to monetize digital assets, and may provide monetization of customization of the CDPs (by means of designing and building the construction artefacts through CDPs). In an embodiment, monetization is performed by providing support for ability to invite bids on customization of the CDPs. In an additional or alternate embodiment, monetization is performed by providing support for ability to invite bids to build based on custom designs of the construction artefacts.

In an embodiment, the Factory Interface module 230 may provide an interface to one or more factories for manufacturing one or more construction artefacts associated with the customized CDPs based at least on bids on customization of the CDPs. In a way, points and financial incentivization on the digital platform may be realized through the Marketplace module (Subsystem 3).

In an embodiment, the Efficiency Analyzer module 232 may output efficiencies related to the one or more factories working on the customized CDPs to manufacture the one or more construction artefacts. In a way, the Efficiency Analyzer module 232 analyzes the one or more factories working on the customized CDPs to know their efficiencies.

In an embodiment, the Support and Maintenance module 234 may output one or more suggestions on how to provide support and maintenance of the one or more custom construction artefacts manufactured utilizing the computing system 200. This is one of the many technical advantages that the computing system 200 has to offer.

4.0 File to Factory Service

In various embodiments, a File to Factory (F2F) service may be hosted by the server computer 106 of FIG. 1, for streamlining design through manufacturer and/or assembly of physical products. The F2F service utilizes a software application that enables collaborative teams to bring their knowledge and capabilities into customizable products that restrict BIM users/designers to design within the realm of what is achievable by specific supply chain members. The customizable products may have embedded rules to automate the generation of information required to actually manufacture and/or assemble the physical product. The software application connects all parties with two-way data flow as meta-data remains in the cloud.

The software application incorporates CDPs for integrating design through manufacturing and/or assembly of each physical product. CDPs incorporate constraints and efficiencies in areas such as manufacturing, and limit BIM users/designers to specifications within parameters and options that are consistent with the constraints. CDPs are developed for a specific physical product by teams which may include members, such as, one or more CDP product designers, assemblers, manufactures, material suppliers, or consultants. Once BIM users/designers have specified a custom physical product within the allowable constraints, the CDP outputs instructions to a project delivery team to make the customized physical product. The CDP is represented through an easily adaptable and simplified graphical model (e.g., both 2D and 3D, in some embodiments) that may operate as a parametric component within existing third-party design/BIM software, and link in parallel with a cloud platform which hosts the associated data and related algorithms to convert the data into the formats required to streamline project delivery.

The software application further incorporates a configurator plugin for BIM software where components are represented through their own interface with a component configurator which has the adaptable parameters represented. The software application also further incorporates a developer plugin that sits within visual coding platforms to enable CDP developers and owners to create, adapt, and monetize CDPs.

The F2F service incorporates at least one web-based portal for the CDP owners, CDP developers, CDP users (BIM users/designers), and CDP customers to use, manage, review, and/or purchase CDPs.

Inclusive in this disclosure is a new and unique file type, known as a .cdp file (pronounced "dot CDP"). This unique file type represents each customizable digital product in its own readable file format to be exported, shared, and imported between users of this disclosure on its platform including the digital construction elements' design marketplace. CDP files may be bought and sold on the digital construction elements' design marketplace as .cdp files, and interpreted in BIM software through the user/designer plugin as .cdp files.

Figure 3:
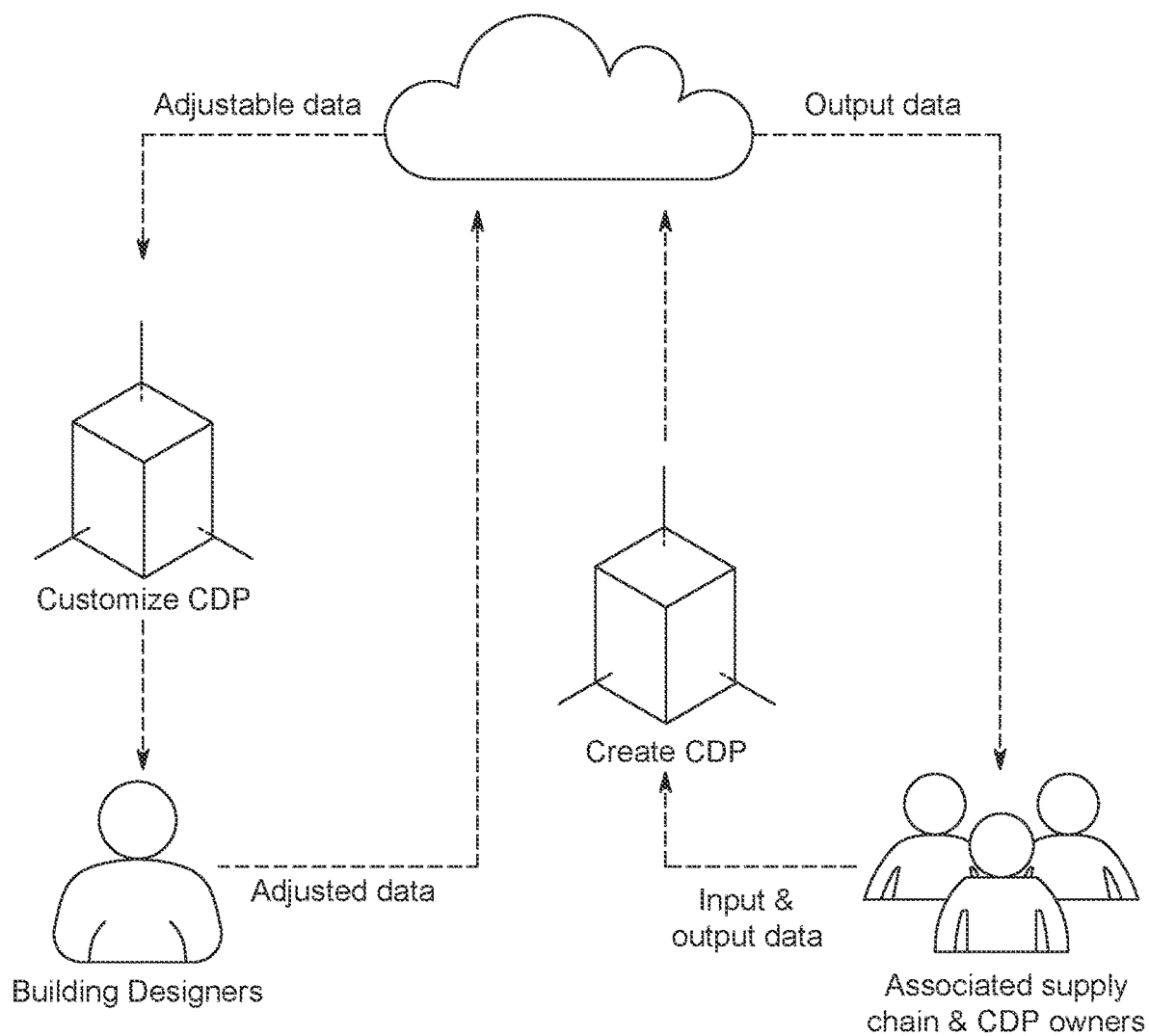
FIG. 3 is a schematic diagram illustrating an overview of use of a File to Factory (F2F) service, according to an embodiment.

FIG. 3 is a schematic diagram illustrating an overview of use of the F2F service. The F2F service is based around the notion of component-based and parametric design, relying on and enabling the Architecture, Engineering, and Construction (AEC) industry to build upon already established BIM software platforms that designers already use, to build parametric components and streamline project documentation. The F2F service teamed with the CDPs transforms this notion into a sophisticated approach where the components are much more than just graphical representation.

CDPs are a sophisticated algorithm in the AEC industry which is developed specific to the design, manufacturing, and scheduling of a to-be-built physical product. Building upon the logic of BIM and parametric design, the CDP restricts design changes to the input parameters. These input parameters are related directly to the capabilities of the embedded and associated supply chain. These input parameters bring the knowledge, that commonly sits in silo with a long list of different suppliers and consultants, into a simple digital component with a set of adjustable parameters directly related to what is achievable.

For example, the associated supply chain and CDP owners create a CDP by identifying input data (e.g., specifications and constraints, including manufacturing capabilities) and output data (e.g., instructions, schedules, approval drawings, manufacturing machine files), and embedding the data into an algorithm that remains native to the cloud. The CDP is created for the integrated design and production of a given to-be-built physical product. The associated supply chain team may include, but is not limited to, cost estimators, material suppliers, manufacturers, assemblers, and distributors. The CDP owner may or may not be a member of the associated supply chain team.

In the example of FIG. 3, the CDP and all associated meta-data resides in the cloud. As shown in FIG. 3, the building designers may access the CDP and make design choices and/or changes within the constraints of the adjustable data. The adjusted data resides in the cloud. Once a building designer has specified the design of a physical product within the constraints, the CDP may automatically create the output data for production of the physical product by one or more of the associated supply chain team members.

The CDP is represented through an easily adaptable and simplified graphical model (e.g., both 2D and 3D in some embodiments) that may operate as a parametric component within existing third-party design/BIM software and link in parallel with a cloud platform which hosts associated data. The associated data makes up an exact replica of the built form down to the finest details but does not represent this graphically. The associated data is left as raw data within the cloud.

With each change made by the building designers, the CDP automatically adjusts the output data based upon the inbuilt relationships determined (parametrically). These adjustments enable the correct details and output to streamline the delivery of the physical product to be available in real time. The raw meta-data that exists within the algorithm may be adjusted to the required format to make a seamless link for project delivery dependent upon the manufacturer, builder, and/or software.

Figure 4:
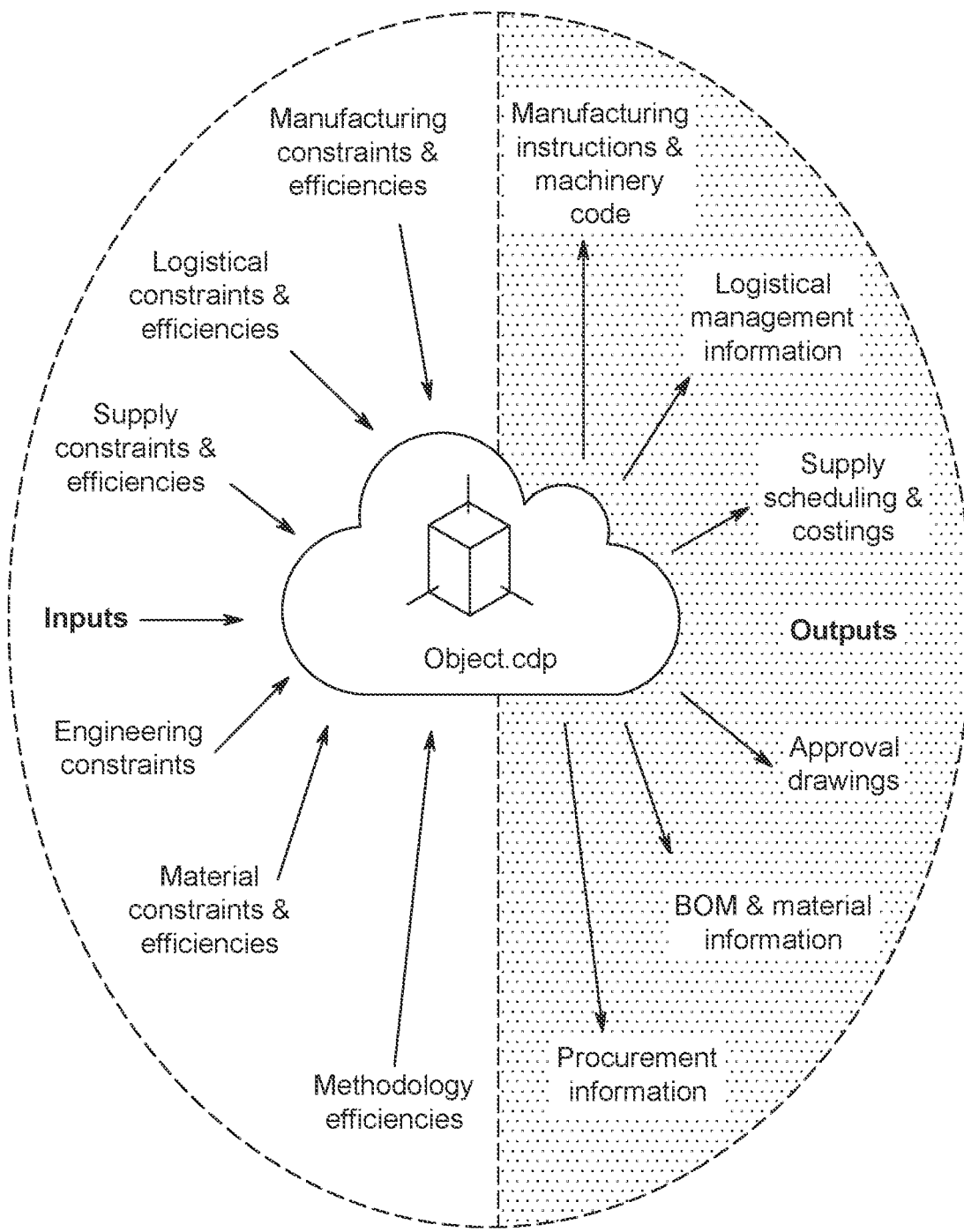
FIG. 4 is a schematic diagram illustrating example inputs and outputs to a customizable digital product (CDP), according to an embodiment.

FIG. 4 is a schematic diagram illustrating the various inputs and outputs to a CDP. The non-limiting set of inputs to the CDP shown in FIG. 4 includes manufacturing constraints and efficiencies, logistical constraints and efficiencies, supply constraints and efficiencies, engineering constraints, material constraints and efficiencies, and methodology efficiencies. Further, the non-limiting set of outputs of the CDP shown in FIG. 4 includes manufacturing instructions and machinery code, logistical management information, supply scheduling and costing, approval drawings, bill of materials, and material information, and procurement information. As with the input parameters, the amount of output data that may be extracted is extensive. By adding the required output code to transform the data, the exact output to create the physical product may be created autonomously from the adjusted data created by the BIM user.

Figure 5:
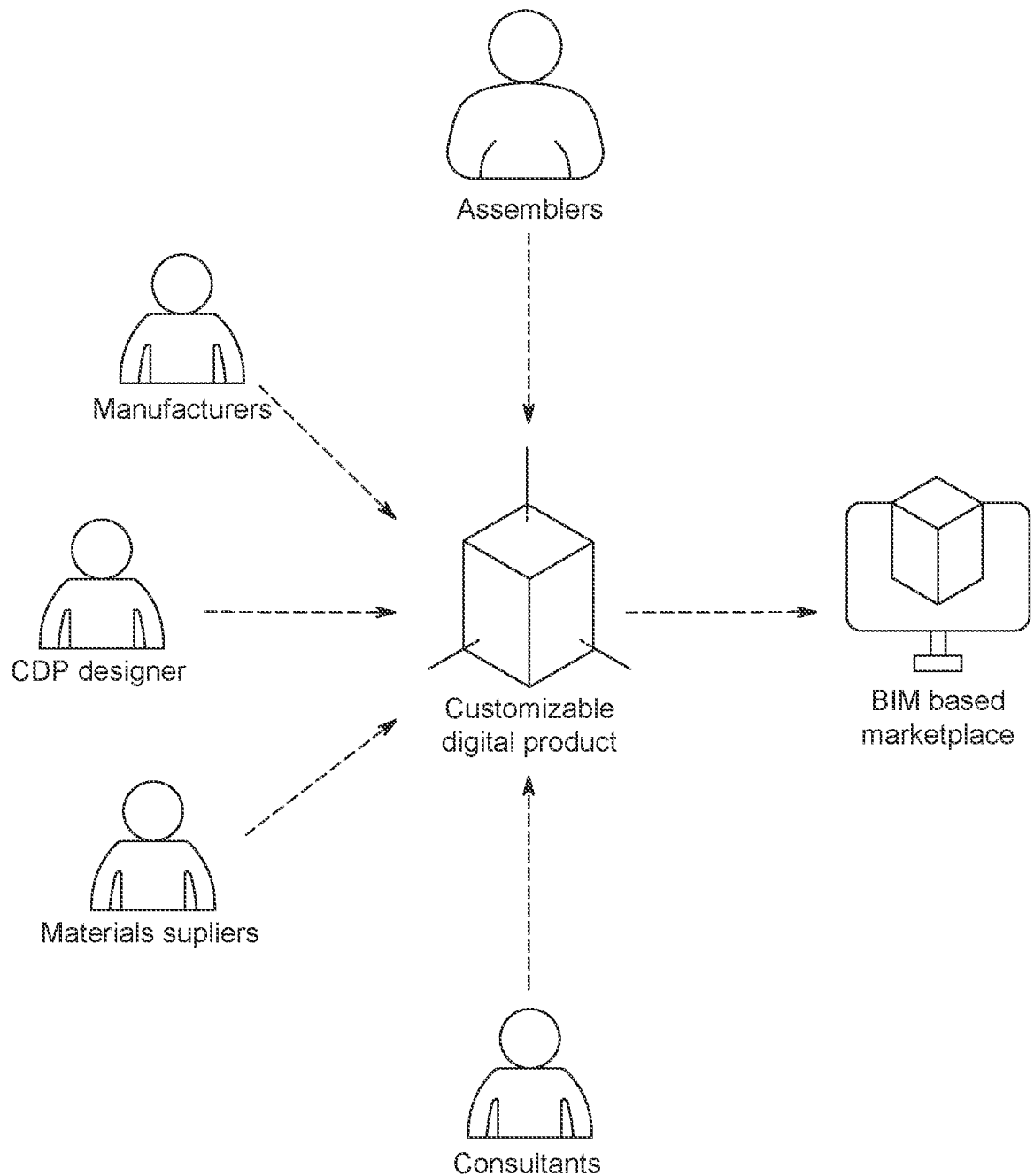
FIG. 5 is a schematic diagram illustrating development of a customizable digital product (CDP), according to an embodiment.

FIG. 5 is a schematic diagram illustrating the development of a CDP. The CDP is developed utilizing Design for Manufacture and Assembly (DFMA) techniques teamed with computational design with the intention of enabling the AEC industry to move away from a service driven model and into the development of CDPs. FIG. 5 shows an exemplary collaborative team of CDP product designers, manufacturers, assemblers, material suppliers, and consultants that may combine their knowledge to make a CDP. The team is able to combine their knowledge into parametric models that restrict the adaptability of a to-be-built physical product based on what is actually achievable. The team is able to create a CDP that may provide the value of Early Contractor Involvement (ECT) without the need to physically engage in any work.

The associated team embeds the outputs particular to their requirements to streamline the delivery from digital product to build physical product. The associated team also links the relationships between elements to automate the design processes. For example, if a design change is made in one piece of a physical product, any implicit changes in other pieces of the physical product are automatically made. The outputs are customized specific to the associated team's machinery, technology, software, and supply chain. The pricing, timing, scheduling, and methodologies are resolved to the finest of details for all elements.

In order to build a CDP, the manufacturing and construction methodologies are developed using DFMA techniques to break down each sub-element of the physical product and raw material into the finest detail, designing the process as well as the overall physical product. The DFMA approach ensures that the entire process of both manufacture and assembly is understood and designed into the CDP.

This process of understanding and designing every detail allows the CDP to be developed with the constraints of what can be achieved with the material, manufacturing, and assembly systems. These constraints may take the form of a set of parameters in the CDP. Computational design may be employed to build out the parametric algorithm which details the components as groups of objects that relate to one another. Adaptations in a related sub-component to changes in a first sub-component are dependent upon the set of parameters. These relationships are built as a set of rules within the algorithm that then produces the required input and geometry data to form a fully parametric model and graphical representation within BIM software.

Dependent upon the BIM software, the input and geometry data may vary but may still be produced using the same approach with extra code being added to the algorithm to convert the data into the form required. The algorithm itself may be hosted external to the BIM software through a cloud server with the output data connecting and rebuilding a parametric graphical representation within the BIM platform.

Figure 6:
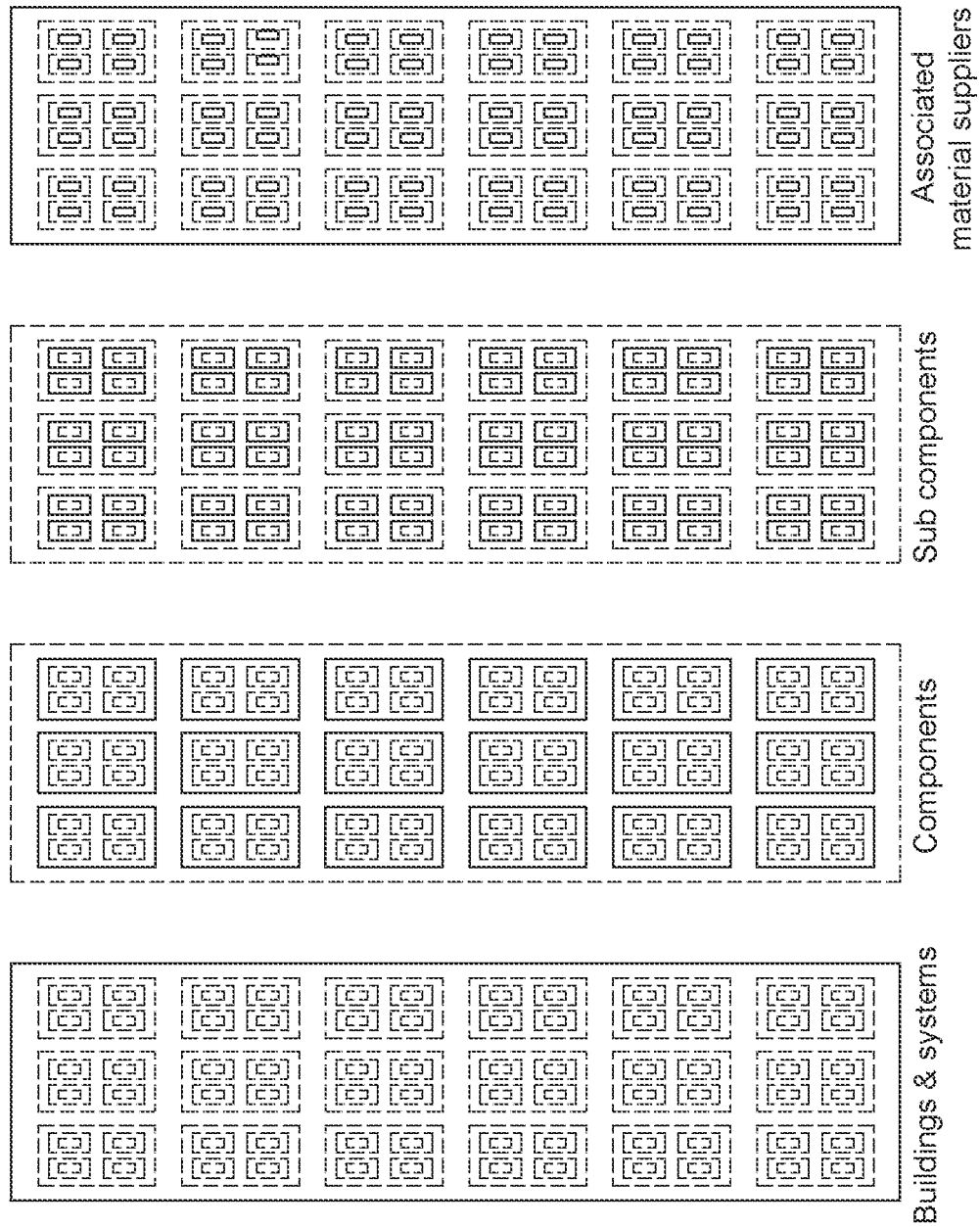
FIG. 6 is a schematic diagram illustrating an integration of multiple customizable digital products (CDPs) from buildings through associated material suppliers, according to an embodiment.

FIG. 6 is a schematic diagram illustrating an integration of multiple CDPs. FIG. 6 shows several different components that represent the design through manufacturing and/or assembly for making a building. Eighteen components are shown in the illustration of FIG. 6 with each component being made up of four sub-components. At its most granular level, a CDP encompasses the design through manufacturing and/or assembly of a physical product requiring at least one material to be obtained from a material supplier. As illustrated in FIG. 6, a material supplier is associated with each subcomponent. Assuming that each subcomponent is unique, the building illustrated in FIG. 6 could be built using seventy-two CDPs.

An example CDP is a bathroom pod CDP as a bathroom pod may be one of many physical products that make up a building. Although the CDP may be seen as the digital product, it is made of thirteen sub-components that are all CDPs in their own right. There are specific teams of suppliers, manufacturers, and assemblers associated with each of the thirteen CDPs. CDPs for each of the thirteen sub-components is granular down to the level of specifying the raw materials used to make the sub-component.

An example of one of the thirteen sub-components is a wall assembly for a bathroom pod. This wall assembly CDP may be made up of Light Gauge Steel (LGS) framing machines and assembly teams, sheathing, Computer Numerical Control (CNC) machining, screws, rivets, steel coil, and even logistics. The sheathing, screws, rivets, and steel coils are examples of associated materials as shown in FIG. 6. Each element of the CDP has its own restrictions, output requirements, and design knowledge. The wall assembly CDP may not only automatically create the G-code or CAM process for the CNC machine and LGS framing machine, it may also create a critical path for ordering and manufacturing of the elements.

Additionally, the wall assembly CDP may have inbuilt relationships between each element of all the CDPs for the bathroom pod. For example, if a basin is moved, it has a direct relationship to a faucet which also moves. This then has repercussions to sheathing, which requires the holes to be moved and the G-code for the CNC machine to be amended. Moving the basin also affects the framing, where the studs need to be placed, and in turn the G-code for the framing machine needs to be amended. All these changes may also affect the amount and location of fixings, plumbing, and required documentation and assembly instructions. The CDP automates this entire process and ensures the changes are both made correctly and that the required output data is generated to streamline the manufacturing, delivery, and assembly of the wall assembly.

Figure 7:
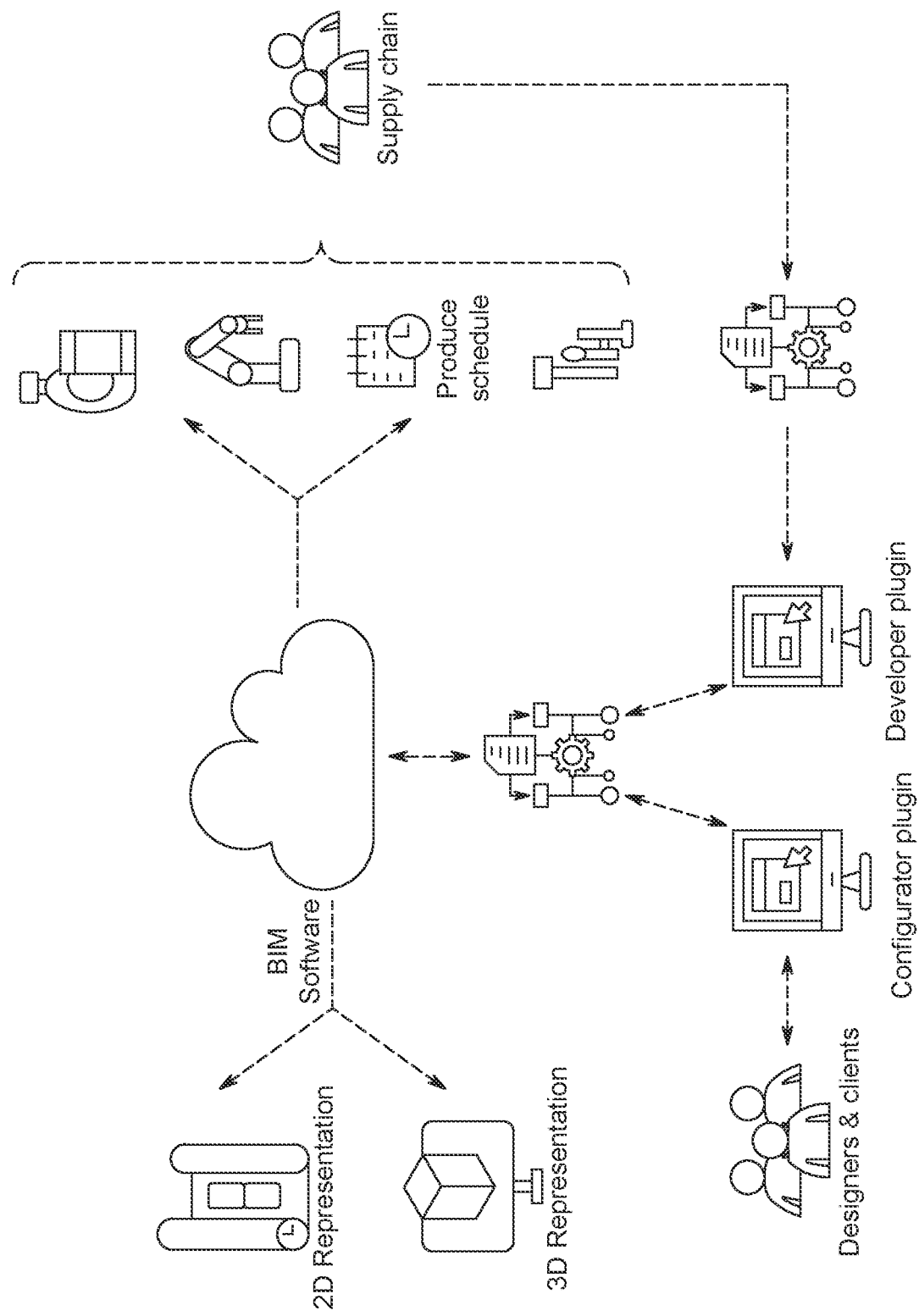
FIG. 7 is another schematic diagram illustrating use of a File to Factory (F2) service, according to an embodiment.

FIG. 7 is another schematic diagram illustrating use of the F2F service in greater detail. It is intended that CDPs become available within both CDP marketplace portal and plugins where they may be customized and placed within a project, and the CDP developer/owner marketplace portal and plugins where they may be made available for other teams to embed within their development of new products.

FIG. 7 shows a configurator plugin that may be used by the BIM users/designers to specify the design of a physical product within limitations set in the CDP. There are algorithms to interface input from the configurator plugin and the data in the cloud with BIM software. Based upon the design choices and the CDP, the BIM software may output 2D and 3D representations of the component. The CDP may also output significant data as noted previously. Illustrated output of the CDP, in FIG. 7, is quantified costs, machinery G-Code, production schedule, and detailed Bill of Materials (BOM) and procurement. The path in FIG. 7 from the configurator plugin through the BIM software and the associated output data is an illustration of the BIM-based marketplace and software application.

FIG. 7 also shows a developer plugin that may be built, where associated supply chain and CDP owners may create CDPs. Required data from several supply chain partners is inputted into an algorithm and converted into a format appropriate for the developer plugin. There are algorithms to interface input from the developer plugin and the data in the cloud with BIM software. The path in FIG. 7 from the developer plugin through the BIM software and the associated output data is an illustration of the CDP developer/owner software application.

Dependent upon the BIM software, the input and geometry data may vary but may still be produced using the same approach with extra code being added to the algorithm to convert the data into the format required. The algorithm itself is hosted external to the BIM software through a cloud server with the output data connecting and rebuilding a parametric graphical representation within the BIM platform.

This is achieved through a plugin software application within the BIM software that takes the graphical data in the form of points, vectors, lines, curves, surfaces, breps, and meshes, and through custom connectors rebuilds the geometry associated with a generic BIM object or category.

Unlike most standard BIM objects that are loaded into the project, manipulated within the software and then exported via 2D documentation and no graphical data, this plugin allows the data to have a 2 directional flow between the associated design team and project delivery team.

The configurator brings all the parameters into the BIM software for designers and BIM users to manipulate the CDP within the confines of what is achievable with the data staying native in the cloud. There is no need to convert the non-graphical data to graphical data and then back again, all data stays within the algorithm and is only converted to required format as needed.

It is also through the F2F plugin that 2D documentation may be automated and available for export. Utilizing the documentation tools native BIM software users may both embed the CDP within their larger project but also develop automated drawings associated with the CDP independently.

In an embodiment, the CDP developer/owner marketplace portal and plugins may be an interface for the CDP creators and suppliers to both build and manage their components. This is achieved by creating a simple interface where CDP development teams may link in parametric scripts developed in off-the-shelf systems and visual coding platforms such as Grasshopper or generic code language such as Python or C# with plugin components that convert the required data. Using the same process as the configurator the teams may then adapt the linked script through certain identified input parameters and link the output data to the required software API, manufacturing machinery, and associated supply chain.

The CDP developer/owner marketplace portal and plugins form the basis for an opensource marketplace for developers and product owners to create and share CDPs and converting components that convert the required data into the range of forms required to run machinery, integrate with software APIs, and automatically generate project schedules and procurement.

Referring to FIG. 7, data in both graphical and non-graphical forms is native to the cloud and is readily available to the associated team required to deliver the built physical product. The CDP is not loaded into BIM software with the associated data set for documentational purposes, the CDP uses the BIM software to present a simple graphical representation to the user whilst the rich metadata remains within the cloud.

This enables project delivery teams to automate tasks which usually require redevelopment of the data that is represented in 2D documentation generated by the BIM software into various forms required to deliver the built physical product. Each team, for example, procurement, manufacturing, and assembly process team has ready access to the real-time data in a useful form. By associating a particular team, the data may be converted algorithmically to automate the process for the specific team.

As an example, an automated task may easy be showcased with the light gauge steel framing for the bathroom pod CDP example above. The suppliers of frames typically operate machines that requires the design to be rebuilt within their own software where the graphical data applies parametric rules to create instructions (G-Code) for the CNC machine to produce the frames semi-autonomously. The software places holes for rivets, crimps, and cuts the required lengths of steel framing, making it very easy to assemble. The non-graphical data such as quantity of screws and length of steel coil required is then made available for the manufacturer to then procure through an entirely separate system. By firstly keeping the data within the central server location (cloud) and secondly, having a particular suppliers and machine associated with the CDP, the F2F service is able to streamline the entire process.

The cloud-based algorithm restricts the BIM user/designer through the plugin and outlined parameters. The CDP, using graphical data, reproduces framing within BIM and automatically produces the G-Code, etc. The CDP does not represent the screws, crimps in a graphical form, simply keeping the information within algorithm and in its native form to then be converted in the multiple data forms for each team to automate the process.

The associated supply chain's requirements are also built into the algorithm converting this raw data into the many different formats required. These may vary from detailed material lists or quantities to purchase orders, RFID tags, specific data for machinery or ERP software and may be changed or added to at any time. Specific costs associated with material, labor, and machinery time are also entered by the associated suppliers allowing the algorithm to calculate overall costs and giving real-time costing to the BIM user. This dynamic nature of the algorithm allows for the entire process to be developed in order to create full autonomy. Suppliers may be able to benefit from receiving the extra and correct data, enabling them to also adopt high-tech machinery that usually requires added processes.

In some embodiments, the process is fully automated. A fully automated process from design to built physical product determines a critical path or step by step process to build the physical product outlined and attached to the CDP. This critical path may be developed and attached through the F2F plugin or a third-party software. It once again takes the raw meta data and applies rules and production sequence to each subcomponent and material. This teamed with RFID tags provides real-time updates and tracking of the production process for CDP users and associated supply chain through BIM software relevant portal. The CDP and F2F service inventions transform industrialized construction and BIM software whilst enabling the entire AEC industry. They provide a two directional data flow between designs, manufactures, and suppliers whilst maintaining a rich central data source where everything is a known entity. This invention dramatically reduces risk and inflation whilst improving productivity and creates a future marketplace where everyone is virtually vertically integrated.

5.0 Procedural Overview

Figure 8:
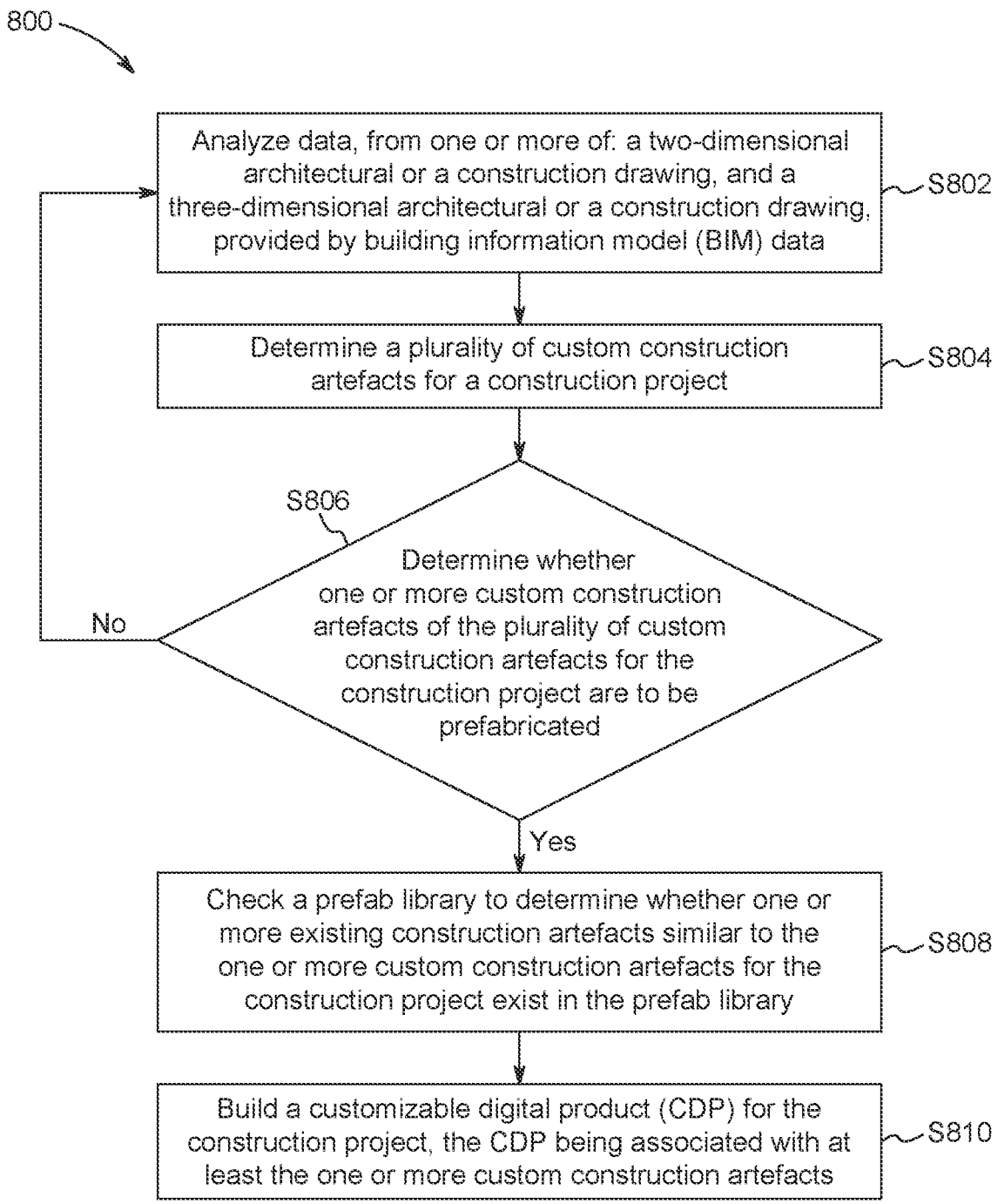
FIG. 8 is an exemplary flowchart illustrating method steps of building a customizable digital product (CDP) for a construction project, according to an embodiment.

FIG. 8 is an exemplary flowchart 800 illustrating method steps of building a CDP for a construction project, according to an embodiment, where the CDP is associated with at least one or more custom construction artefacts for the construction project. FIG. 8 may be used as a basis to code the method as one or more computer programs or other software elements that a computing device, such as the server computer 106 of FIG. 1, can execute or host.

In step S802, the computing device may analyze one or more of: a two-dimensional architectural or a construction drawing, and a three-dimensional architectural or a construction drawing, provided by BIM data. In an embodiment, the computing device may analyze the BIM data by analyzing data from one or more of: floor plans of a construction project, a construction schedule for the construction project, a list of associated tasks in business process workflow for the construction project, a list of dependencies associated with the construction project, material requirements for the construction project, and labor needs for the construction project.

In step S804, the computing device may determine a plurality of custom construction artefacts for the construction project from the analysis performed at S802.

In step S806, the computing device may determine a requirement of prefabricating at least one custom construction artefact of the plurality of custom construction artefacts, related to a constructional representation corresponding to the construction drawing, based on the analysis of the BIM data. For example, it may be determined whether one or more custom construction artefacts of the plurality of custom construction artefacts for the construction project are to be prefabricated. If yes, the flow of the operations may proceed on to step S808. If no, the computing device may continue analyzing the BIM data at step S802 and a control passes to next step S808 only upon meeting a predefined criterion which may include the feasibility threshold. In an embodiment, the determination as to whether the one or more custom construction artefacts of the plurality of custom construction artefacts for the construction project are to be prefabricated may be based at least on performing intent analysis to determine an intent and/or a set of objectives for the one or more custom construction artefacts that are to be prefabricated. In an embodiment, the determination of the intent and/or the set of objectives for the one or more custom construction artefacts that are to be prefabricated may be based at least on evaluating feasibility of dissembling, shipping, and reassembling the one or more custom construction artefacts that need to be prefabricated and brought to a construction site of the construction project.

In step S808, the computing device may check the prefab library to determine whether any existing construction artefacts in the prefab library are similar to the one or more custom construction artefacts for the construction project. For example, a database of one or more existing construction artefacts is searched to determine if at least one existing artefact similar to at least one custom construction artefact of the plurality of custom construction artefacts for the construction project, exists within the database. In an embodiment, one or more existing construction artefacts, different from the one or more custom construction artefacts to be prefabricated, may be recommended in response to determining that none of the existing construction artefacts are similar to the plurality of custom construction artefacts of the construction project. Further, in an embodiment, construction artefacts may be designed (build) to be reused. These construction artefacts may be stored in the design library and made available for reuse in current and other constructions projects.

In step S810, the computing device may build a CDP for the construction project through a design generator unit and a rendering unit. In an embodiment, determining an absence of the searching performed in step S808 may act as a trigger for building the CDP in step S808. The CDP may be associated with at least the one or more custom construction artefacts for the construction project. In an embodiment, the building of the CDP for the construction project may be based at least on: computing by the design generator unit optimal designs for manufacturing the one or more custom construction artefacts that are to be prefabricated based at least on one or more of: determined intent and/or the objective in step S808, existing construction artefacts of the prefab library, physical elements associated with the construction project, nature of construction of the construction project, geography at the construction project, and local topology related to the construction project; and outputting a set of optimal design parameters for the computed optimal designs to meet assembly requirements of the one or more custom construction artefacts that are to be prefabricated. In an additional or alternative embodiment, the building of the CDP for the construction project may be based at least on providing a user interface (e.g., a graphical user interface) to enable a user to provide inputs for optimal designs for manufacturing the one or more custom construction artefacts that are to be prefabricated; and providing a visual display to the user to enable product simulation of at least the one or more custom construction artefacts that are to be prefabricated. The product simulation performed by the rendering unit enables the user to visualize the product that is taking shape and providing the visual display to the user further enables the user to execute visual modifications in real-time upon the product that is being configured through a human-computer interface or a user interface. In an additional or alternative embodiment, the building of the CDP for the construction project may be based at least on determining whether the one or more custom construction artefacts may be prefabricated with a confidence score above a feasibility threshold. In an additional or alternative embodiment, the building of the CDP for the construction project may be based at least on a user's approval regarding the one or more custom construction artefacts that are to be prefabricated.

In view of the above description, the embodiments presented herein make the management of construction projects simple. This is achieved by improving the efficiencies in a construction cycle of a construction project by routing or executing certain aspects of a construction project off site to prefabricate several custom construction artefacts (e.g., building components such as walls, trusses, fixtures, windows, plumbing, floor components, roof components, etc.). Further, the embodiments presented herein provide a system, an apparatus, and a method for an efficient design, manufacture, and customization of construction artefacts or assemblies for a construction project.

In an embodiment, one or more apparatuses may be utilized in implementing embodiments consistent with the present disclosure. In an example, the one or more apparatuses comprise a memory and a processor coupled to the memory. In an example, the processor is configured to perform steps or stages consistent with the embodiments described herein.

In an embodiment, one or more systems may be utilized in implementing embodiments consistent with the present disclosure. In an example, the one or more systems may include one or more entities corresponding to an exemplary system 100 discussed in FIG. 1, the one or more entities being configured to perform steps or stages consistent with the embodiments described herein.

6.0 Example Intent-Based Factorization and Computational Simulation Flow

Figure 9:
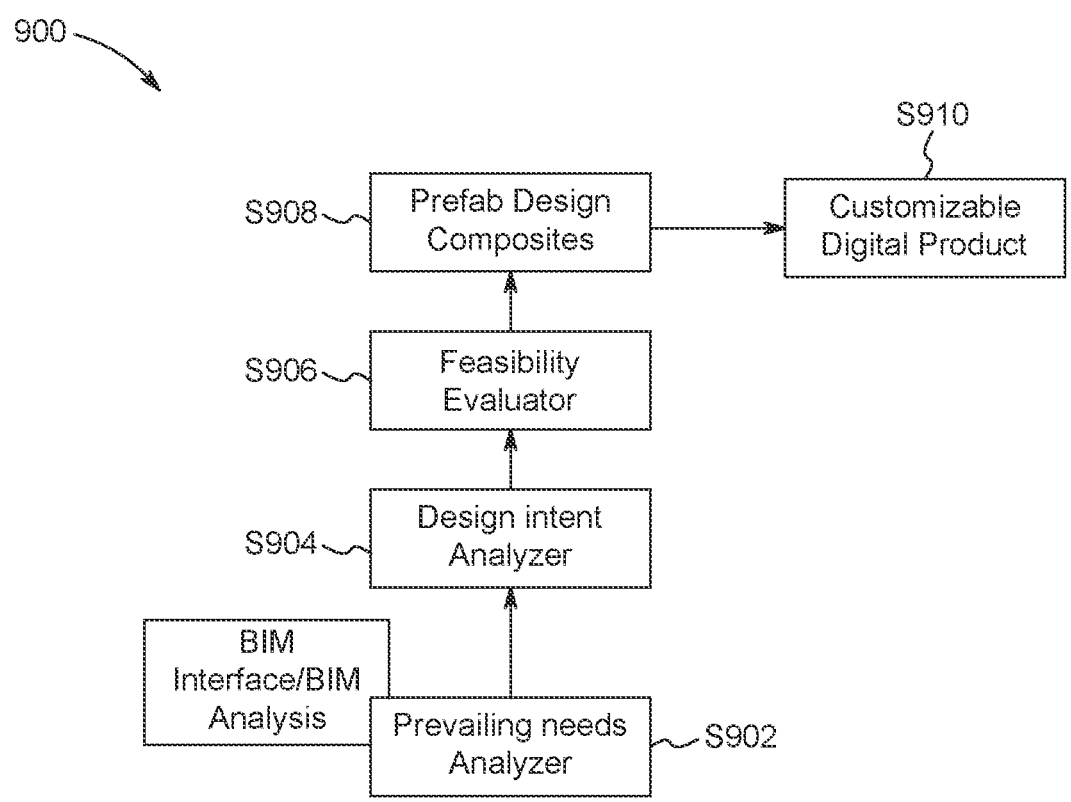
FIG. 9 is another exemplary flowchart illustrating method steps of building a customizable digital product (CDP) for a construction project, according to an embodiment.

FIG. 9 is another exemplary flowchart 900 illustrating various subsystem modules and method steps of building a CDP for a construction project, according to an embodiment. FIG. 9 discusses the various operations performed by the computing system 200 and/or an apparatus associated with the computing system 200 (simply referred herein to as computing system 200 for clarity) for building the CDP for the construction project, according to an embodiment.

In step S902, the computing system 200 (e.g., the Prevailing Needs Analyzer module of the computing system 200) may analyze data related to a constructional representation. Such analysis is done with respect to data defined by one or more of: a floor plan, a construction schedule, at least one task in a process workflow, a dependency, a material requirement, and a laborer requirement. The constructional representation corresponds to an architectural or a construction drawing provided by at least BIM data for the construction project. Such representation may be selected from one or more of: a two-dimensional architectural or a construction drawing, and a three-dimensional architectural or a construction drawing provided by the BIM data. The BIM data may be received via the BIM interface. In an embodiment and as indicated above, the computing system 200 may analyze the BIM data by analyzing data from one or more of: floor plans of a construction project, a construction schedule for the construction project, a list of associated tasks in business process workflow for the construction project, a list of dependencies associated with the construction project, material requirements for the construction project, and labor needs for the construction project. The computing system 200 may determine a plurality of custom construction artefacts for the construction project.

In step S904, the computing system 200 (e.g., the Design Intent Analyzer module of the computing system 200) may determine a requirement of prefabricating at least one custom construction artefact of the plurality of custom construction artefacts related to the constructional representation based on the analysis of the BIM data. The determining of the requirement may be based on searching a database of one or more existing construction artefacts to determine if at least one existing construction artefact similar to the at least one custom construction artefact exists within the database. The database may be the prefab library. For example, it may be determined whether one or more custom construction artefacts of the plurality of custom construction artefacts for the construction project are to be prefabricated. If yes, the flow of the operations may proceed on to step S906. Otherwise, the computing system 200 may continue analyzing the BIM data and a control passes to next step S906 only upon meeting a predefined criterion (or criteria).

Additionally at step S904, at least one of: an intent and/or at least one objective associated with the at least one custom construction artefact is determined. Such determination is based at least on evaluating feasibility of dissembling, shipping, and reassembling the at least one custom construction artefact to be prefabricated at a construction site. In an embodiment, the determination as to whether the one or more custom construction artefacts for the construction project are to be prefabricated may be based at least on performing intent analysis to determine an intent and/or a set of objectives for the one or more custom construction artefacts that are to be prefabricated. In an embodiment, the determination of the intent and/or the set of objectives for the one or more custom construction artefacts that are to be prefabricated may be based at least on evaluating feasibility of dissembling, shipping, and reassembling the one or more custom construction artefacts that need to be prefabricated and brought to a construction site of the construction project.

In step S906, the computing system 200 (e.g., the Feasibility Evaluator module of the computing system 200) may check the prefab library to determine whether one or more existing construction artefacts similar to the one or more custom construction artefacts for the construction project exist in the prefab library. For example, a database of one or more existing construction artefacts is searched to determine if at least one existing artefact similar to the at least one custom construction artefact exists within the database. Further, one or more existing construction artefacts, different from the one or more custom construction artefact to be prefabricated, may be recommended in response to determining that no existing construction artefacts similar to the one or more custom construction artefacts of the construction project exist in the prefab library. Further, in an embodiment, construction artefacts may be designed to be reused. In an implementation, the determination of the at least one objective and/or the intent of step S904 may also be based on determining an absence of at least one existing construction artefact similar to the at least one custom construction artefact, within the prefab library, where such determined objective and/or intent is directly used for simulation in step S908.

In step S908, design simulation of the custom construction artefact is enabled based on the determination of the intent and/or the at least one objective to render a digital representation of a product. Additionally, in step S908, the computing system 200 (e.g., the Prefab Design Composites module of the computing system 200) may build a CDP for the construction project through a design generator unit and a rendering unit. In other example, determining an absence of the searching performed in step S906 may act as a trigger for building the CDP in step S908. The CDP may be associated with at least the one or more custom construction artefacts. In an embodiment, the building of the CDP for the construction project may be based at least on: computing by a design generator unit, optimal designs for manufacturing the one or more custom construction artefacts that are to be prefabricated based at least on one or more of: determined intent and/or the objective in step S908, existing construction artefacts of the prefab library, physical elements associated with the construction project, nature of construction of the construction project, geography at the construction project, and local topology related to the construction project. Further, a set of optimal design parameters, for the computed optimal designs to meet assembly requirements of the one or more custom construction artefacts that are to be prefabricated, are outputted.

In an embodiment, the building of the CDP for the construction project may be based at least on providing a user interface to enable a user to provide inputs for optimal designs for manufacturing the one or more custom construction artefacts that are to be prefabricated, and providing a visual display to the user to enable product simulation of at least the one or more custom construction artefacts that are to be prefabricated. In step S910, the computing system 200 (e.g., the CDP module of the computing system 200) may allow for visualization of a physical product corresponding to the CDP. The product simulation performed by a rendering unit enables the user to visualize the product that is taking shape and providing the visual display to the user further enables the user to execute visual modifications in real-time upon the product that is being configured through a human-computer interface or a user interface. In an additional or alternative embodiment, the building of the CDP for the construction project may be based at least on determining whether the one or more custom construction artefacts may be prefabricated with a confidence score above a feasibility threshold. In an additional or alternative embodiment, the building of the CDP for the construction project may be based at least on a user's approval regarding the one or more custom construction artefacts that are to be prefabricated.

An embodiment of the present disclosure describes a product-simulation system for simulating in a computing environment. The system comprises a prevailing needs analyzer configured to analyze data related to a constructional representation; and determine a requirement of prefabricating at least one custom construction artefact for a construction project based on the analysis of the data. Further, the system comprises an intent analyzer configured to determine at least one of: an intent and at least one objective associated with the at least one custom construction artefact and a rendering unit configured to enable simulation of the at least one custom construction artefact based on the determination of the intent or the at least one objective to render a digital representation of the product.

In an embodiment of the present disclosure, the prevailing needs analyzer, for analyzing the data related to the constructional representation, is configured to analyze the data from one or more of floor plans of the construction project, a construction schedule for the construction project, a list of associated tasks in a business process workflow for the construction project, a list of dependencies associated with the construction project, material requirements for the construction project, and labor needs for the construction project.

In an embodiment of the present disclosure, the intent analyzer is configured to determine at least one of the intent and the at least one objective associated with the at least one custom construction artefact is based at least on evaluating feasibility of dissembling, shipping, and reassembling the at least one custom construction artefact to be prefabricated at a construction site.

In an embodiment of the present disclosure, the prevailing needs analyzer is configured to search a database of one or more existing construction artefacts to determine if at least one existing construction artefact similar to the at least one custom construction artefact to be prefabricated exists within the database and trigger the rendering unit for simulating the at least one custom construction artefact to be prefabricated based on determining an absence in the database based on the search.

In an embodiment of the present disclosure, the constructional representation corresponds to an architectural or a construction drawing provided.

In an embodiment of the present disclosure, the prevailing needs analyzer, for analyzing the data related to the constructional representation, is configured to analyze data from one or more of a two-dimensional architectural or a construction drawing, and a three-dimensional architectural or a construction drawing.

In an embodiment of the present disclosure, a non-transitory computer-readable storage medium, having stored thereon a computer-executable program which, when executed by at least one processor, causes the at least one processor to analyze data related to a constructional representation, determine a requirement of prefabricating at least one custom construction artefact for a construction project based on the analysis of the data, determine at least one of: an intent or at least one objective associated with the at least one custom construction artefact, and enable simulation of the at least custom construction artefact based on the determination of the intent or the at least one objective to render a digital representation of the product in a graphical user interface.

In an embodiment of the present disclosure, the computer-executable program further causes the at least one processor to determine at least one of the intent and the at least one objective associated with the at least one custom construction artefact based at least on evaluating feasibility of dissembling, shipping, and reassembling the at least one custom construction artefact to be prefabricated at a construction site.

In an embodiment of the present disclosure, the computer-executable program further causes the at least one processor to search a database of one or more existing construction artefacts to determine if at least one existing construction artefact similar to the at least one custom construction artefact to be prefabricated exists within the database and trigger the simulation of the at least one custom construction artefact to be prefabricated based on determining an absence from the searching.

In an embodiment of the present disclosure, the constructional representation corresponds to an architectural or a construction drawing provided by at least a building information model (BIM).

7.0 Other Aspects of Disclosure

In an embodiment, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition, or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the invention has been described with respect to a limited number of embodiments, those skilled in the art, having benefit of this disclosure, will appreciate that other embodiments can be devised which do not depart from the scope of the invention as disclosed herein.

We claim:

1. A method for simulating a product in a computing environment, the method comprising:
   training a machine learning model using training data including data relating to construction artefacts;
   analyzing data related to a constructional representation;
   applying the trained machine learning model to the analyzed data to determine whether offsite manufacturing or procurement of at least one custom construction artefact is feasible;
   determining a requirement of prefabricating the at least one custom construction artefact for a construction project based on application of the trained machine learning model to the analyzed data;
   determining at least one of: a user intent and at least one objective associated with the at least one custom construction artefact, based on evaluating feasibility of dissembling, shipping, and reassembling the at least one custom construction artefact to be prefabricated at a construction site; and
   enabling simulation of the at least one custom construction artefact based on the determination of the user intent or the at least one objective to render a digital representation of the product in a graphical user interface.

2. The method of claim 1, wherein analyzing the data related to the constructional representation comprises analyzing data from one or more of: floor plans of the construction project, a construction schedule for the construction project, a list of associated tasks in a business process workflow for the construction project, a list of dependencies associated with the construction project, material requirements for the construction project, and labor needs for the construction project.

3. The method of claim 1, further comprising:
   searching a database of one or more existing construction artefacts to determine if at least one existing construction artefact similar to the at least one custom construction artefact to be prefabricated exists within the database; and
   triggering the simulation of the at least one custom construction artefact to be prefabricated based on determining an absence from the searching.

4. The method of claim 1, wherein the constructional representation corresponds to an architectural or a construction drawing provided.

5. The method of claim 1, wherein analyzing the data related to the constructional representation comprises analyzing data from one or more of: a two-dimensional architectural or a construction drawing, and a three-dimensional architectural or a construction drawing.

6. The method of claim 5, further comprising building the product for the construction project based at least on:
   computing optimal designs for manufacturing the at least one custom construction artefact that is to be prefabricated based at least on one or more of: existing construction artefacts of a prefab library, physical elements associated with the construction project, nature of construction of the construction project, geography at the construction project, and local topology related to the construction project.

7. The method of claim 6, further comprising:
   outputting a set of optimal design parameters for the computed optimal designs to meet an assembly requirement of the at least one custom construction artefact to be prefabricated.

8. The method of claim 1, wherein simulating the at least one custom construction artefact comprises:
   providing a visual display to a user of the at least one custom construction artefact to be prefabricated; and
   enabling the user to execute a modification in real-time through an interface to the at least one custom construction artefact to be prefabricated.

9. The method according to claim 1, wherein simulating the at least one custom construction artefact comprises determining whether the at least one custom construction artefact to be prefabricated is associated with a confidence score above a threshold.

10. A product-simulation system for simulating in a computing environment, the system comprising:
    a processor configured to:
       train a machine learning model using training data including data relating to construction artefacts;
       analyze data related to a constructional representation;
       apply the trained machine learning model to the analyzed data to determine whether offsite manufacturing or procurement of at least one custom construction artefact is feasible;
       determine a requirement of prefabricating the at least one custom construction artefact for a construction project based on application of the trained machine learning model to the analyzed data;
       determine at least one of: a user intent and at least one objective associated with the at least one custom construction artefact, based on evaluation of feasibility of dissembling, shipping, and reassembling the at least one custom construction artefact to be prefabricated at a construction site; and enable simulation of the at least one custom construction artefact based on the determination of the user intent or the at least one objective to render a digital representation of the product in a graphical user interface.

11. The system of claim 10, wherein the processor, for analyzing the data related to the constructional representation, is configured to analyze the data from one or more of: floor plans of the construction project, a construction schedule for the construction project, a list of associated tasks in a business process workflow for the construction project, a list of dependencies associated with the construction project, material requirements for the construction project, and labor needs for the construction project.

12. The system of claim 10, wherein the processor is configured to:

search a database of one or more existing construction artefacts to determine if at least one existing construction artefact similar to the at least one custom construction artefact to be prefabricated exists within the database; and trigger the rendering unit for simulating the at least one custom construction artefact to be prefabricated based on determining an absence in the database based on the search.

13. The system of claim 10, wherein the constructional representation corresponds to an architectural or a construction drawing provided.

14. The system of claim 10, wherein the processor, for analyzing the data related to the constructional representation, is configured to analyze data from one or more of: a two-dimensional architectural or a construction drawing, and a three-dimensional architectural or a construction drawing.

15. A non-transitory computer-readable storage medium, having stored thereon a computer-executable program which, when executed by at least one processor, causes the at least one processor to:

train a machine learning model using training data including data relating to construction artefacts;

analyze data related to a constructional representation;

apply the trained machine learning model to the analyzed data to determine whether offsite manufacturing or procurement of at least one custom construction artefact is feasible;

determine a requirement of prefabricating the at least one custom construction artefact for a construction project based on application of the trained machine learning model to the analyzed data;

determine at least one of: a user intent and at least one objective associated with the at least one custom construction artefact, based on evaluation of feasibility of dissembling, shipping, and reassembling the at least one custom construction artefact to be prefabricated at a construction site; and enable simulation of the at least custom construction artefact based on the determination of the user intent or the at least one objective to render a digital representation of the product in a graphical user interface.

16. The non-transitory computer-readable storage medium of claim 15, wherein the computer-executable program further causes the at least one processor to:

search a database of one or more existing construction artefacts to determine if at least one existing construction artefact similar to the at least one custom construction artefact to be prefabricated exists within the database; and trigger the simulation of the at least one custom construction artefact to be prefabricated based on determining an absence from the searching.

17. The non-transitory computer-readable storage medium of claim 15, wherein the constructional representation corresponds to an architectural or a construction drawing provided by at least a building information model (BIM).

* * * * *